United States Patent
Altheimer et al.

(10) Patent No.: US 9,176,331 B2
(45) Date of Patent: Nov. 3, 2015

(54) PRESCRIPTION-DEPENDENT AND INDIVIDUALIZATION-DEPENDENT MODIFICATION OF THE TEMPORAL PERIPHERAL NOMINAL ASTIGMATISM AND ADAPTION OF THE OBJECT DISTANCE FUNCTION TO CHANGED OBJECT DISTANCES FOR NEAR AND/OR FAR VISION

(75) Inventors: Helmut Altheimer, Baisweil-Lauchdorf (DE); Robert Kaster, Viersen (DE); Martin Zimmermann, Erdweg-Kleinberghofen (DE); Wolfgang Becken, Munich (DE); Gregor Esser, Munich (DE); Dietmar Uttenweiler, Icking (DE); Andrea Welk, Munich (DE)

(73) Assignee: Rodenstock GmbH, Munich (DE)

( * ) Notice: Subject to any disclaimer, the term of this patent is extended or adjusted under 35 U.S.C. 154(b) by 3 days.

(21) Appl. No.: 13/880,922

(22) PCT Filed: Oct. 13, 2011

(86) PCT No.: PCT/EP2011/005144
§ 371 (c)(1),
(2), (4) Date: Jul. 8, 2013

(87) PCT Pub. No.: WO2012/052133
PCT Pub. Date: Apr. 26, 2012

(65) Prior Publication Data
US 2014/0049747 A1    Feb. 20, 2014

(30) Foreign Application Priority Data
Oct. 21, 2010 (DE) .......................... 10 2010 049 168

(51) Int. Cl.
*G02C 7/02* (2006.01)
*G02C 7/06* (2006.01)

(52) U.S. Cl.
CPC ................ *G02C 7/028* (2013.01); *G02C 7/061* (2013.01); *G02C 7/063* (2013.01); *G02C 7/065* (2013.01)

(58) Field of Classification Search
CPC ....................................................... G02C 7/028
USPC ......................................... 351/159.76, 159.77
See application file for complete search history.

(56) References Cited

U.S. PATENT DOCUMENTS

2004/0017543 A1*  1/2004 Welk et al. .................... 351/168
2011/0208493 A1    8/2011 Altheimer et al.
(Continued)

FOREIGN PATENT DOCUMENTS

DE        102008015189      10/2009
DE        10 2009 005214    7/2010
(Continued)

OTHER PUBLICATIONS

International Search Report issued for PCT/EP2011/005144, date of mailing: Feb. 23, 2012.

*Primary Examiner* — Jordan Schwartz
(74) *Attorney, Agent, or Firm* — Schiff Hardin LLP

(57) ABSTRACT

Method for optimization of a progressive spectacle lens, which method comprises: defining a starting nominal astigmatism distribution for the spectacle lens; determining a transformed nominal astigmatism distribution and optimizing the spectacle lens on the basis of the transformed nominal astigmatism distribution, wherein the determination of a transformed nominal astigmatism distribution comprises multiplication of the maximum temporal nominal astigmatism of the starting nominal astigmatism distribution by a factor k as a result of which a modified maximum temporal astigmatism is obtained, wherein k is a function of a prescription value, and/or at least of one parameter of the spectacle lens or of the arrangement thereof in front of the eyes, and transformation of the starting nominal astigmatism distribution on the basis of the modified maximum temporal astigmatism.

18 Claims, 30 Drawing Sheets

(56) References Cited

U.S. PATENT DOCUMENTS

2011/0279773 A1 11/2011 Drobe et al.
2012/0016645 A1 1/2012 Altheimer et al.
2013/0335699 A1* 12/2013 De Rossi et al. ......... 351/159.42

FOREIGN PATENT DOCUMENTS

| FR | 2894688 | 12/2005 |
| WO | WO 2008/089996 | 7/2008 |
| WO | WO 2010/084019 | 7/2010 |

* cited by examiner

Reciprocal object distance as doubble asymptote function

Reciprocal object distance as doubble asymptote function
A1(y)=A1G(y)+A1Korr(y)

Reciprocal object distance: doubble asymptote function + Gauss

Reciprocal object distance: doubble asymptote function + Gauss
slope (derivative accoding to y)

Reciprocal object distance: doubble asymptote function + Gauss
with linear adjustment to A1distance and A1near Reciprocal object distance: doubble asymptote function + Gauss
with linear adjustment to A1distance and A1near
slope (derivative according to y)

PRESCRIPTION-DEPENDENT AND INDIVIDUALIZATION-DEPENDENT MODIFICATION OF THE TEMPORAL PERIPHERAL NOMINAL ASTIGMATISM AND ADAPTION OF THE OBJECT DISTANCE FUNCTION TO CHANGED OBJECT DISTANCES FOR NEAR AND/OR FAR VISION

BACKGROUND

Aspects of the present invention relate to a computer-implemented method for optimizing and producing a progressive spectacle lens, corresponding devices for optimizing and producing a progressive spectacle lens, corresponding computer program products and storage media, as well as to a use of a spectacle lens.

An optimization of a progressive spectacle lens is usually performed by minimizing a target function in which required or target values for at least one optical parameter, e.g. astigmatism and/or refractive power, or required or target values for at least one aberration, e.g. astigmatic error and/or refractive error, of the progressive spectacle lens are taken into account. In the optimization process of the spectacle lens, the individual prescription values (sph, cyl, axis, add, prism, base), parameters of the individual position or arrangement of the spectacle lens in front of the spectacles wearer's eye (e.g. corneal vertex distance (CVD), face form angle (FFA), forward inclination or pantoscopic angle), as well as physiological parameters (e.g. pupillary distance) can be taken into account. The progressive spectacle lens can be optimized and calculated "online" as one-of-a-kind after receipt of order.

Moreover, DE 10 2008 015 189, DE 10 2009 005 206, or DE 10 2009 005 214 suggest determining the target astigmatism distribution, on the basis of which the progressive spectacle lens is optimized, by means of a transformation of an existing or predetermined design (starting design, base design). For example, DE 10 2008 015 189 suggests calculating target astigmatism distributions for different additions by means of a transformation of a predetermined base or starting target astigmatism distribution, which has been specified for a predetermined base addition. DE 10 2009 005 206 and DE 10 2009 005 214 suggest creating target astigmatism distributions with different widths of the distance and/or near zone(s) from a predetermined target astigmatism distribution by means of manipulation of a predetermined base target astigmatism line. The methods described in DE 10 2008 015 189, DE 10 2009 005 206, or DE 10 2009 005 214 make it possible to simplify the method for optimizing and producing a progressive spectacle lens and making it more efficient and flexible.

SUMMARY

It is an object of the invention to provide improved methods for optimizing and producing progressive spectacle lenses.

This object is solved by a computer-implemented method for optimizing a progressive spectacle lens, a computer program product, a storage medium with a computer program stored thereon, a device for optimizing a progressive spectacle lens, a method for producing a progressive spectacle lens, a device for producing a progressive spectacle lens, and a use of a spectacle lens.

A first aspect of the invention relates to a computer-implemented method for optimizing a progressive spectacle lens, comprising the steps of:

specifying a starting target astigmatism distribution $Ast_{target_{start}}$ for the progressive spectacle lens;

determining a transformed target astigmatism distribution $Ast_{target_{new}}$; and optimizing the progressive spectacle lens on the basis of the transformed target astigmatism distribution.

Determining a transformed target astigmatism distribution $Ast_{target_{new}}$ comprises the steps of:

multiplying the value of the maximum temporal target astigmatism $max\_Ast_{target\_temporal_{start}}$ of the starting target astigmatism distribution $Ast_{target_{start}}$ by a factor k:

$max\_Ast_{target\_temporal_{new}} = k * max\_Ast_{target\_temporal_{start}}$, whereby a modified maximum temporal astigmatism $max\_Ast_{target\_temporal_{new}}$ results, wherein the factor k is a function of at least one prescription value and/or of at least one parameter of the spectacle lens or its arrangement in front of the eyes of the spectacles wearer; and transforming the starting target astigmatism distribution $Ast_{target_{start}}$ on the basis of the modified maximum temporal astigmatism $max\_Ast_{target\_temporal_{new}}$.

As mentioned above, the optimization of progressive spectacle lenses is usually performed by iteratively minimizing a target function in which required or target values for at least one optical parameter (e.g. astigmatism and/or refractive power) or required or target values for at least one aberration (e.g. astigmatic error and/or refractive error) of the progressive spectacle lens are taken into account. The refractive error represents the difference of the refractive power of the spectacle lens to the refractive power determined by means of refraction determination. Preferably, these are values in the wearing position of the spectacle lens, i.e. taking the system spectacle lens-eye into account. The degree of freedom in the optimization of the target function is usually the vertex depth of the front surface or back surface of the spectacle lens, or of both the front and back surfaces, e.g. in the case of a double progressive spectacle lens.

For example, a design-based optimization of a progressive spectacle lens can be performed by minimizing a target function of the form:

$$F(\vec{x}) = \sum_{i=1}^{m} [g_{i,Ast}(Ast_i - Ast_{i,target})^2 + ...] \quad (1)$$

or of the form:

$$F(\vec{x}) = \sum_{i=1}^{m} [g_{i,\Delta R}(\Delta R_i - \Delta R_{i,target})^2 + g_{i,Ast}(Ast_i - Ast_{i,target})^2 + ...] \quad (2)$$

In the above formula:

$\Delta R_{i,target}$ is the target value of the local refractive error/refractive power at the $i^{th}$ evaluation point;

$\Delta R_i$ is the actual local refractive error/refractive power at the $i^{th}$ evaluation point;

$Ast_{i,target}$ is the target value of the local astigmatic error/astigmatism at the $i^{th}$ evaluation point;

$Ast_i$ is the actual local astigmatic error/astigmatism at the $i^{th}$ evaluation point;

$g_{i,\Delta R}$ is the local weighting of the refractive error/refractive power at the $i^{th}$ evaluation point;

$g_{i,Ast}$ is the local weighting of the astigmatic error/astigmatism at the $i^{th}$ evaluation point.

The actual and target values of the at least one optical property, which are taken into account in the target function, may be both target values (surface values or values in the wearing position) of the spectacle lens and target values for at least one aberration. Within the scope of this application, the term "target astigmatism" is understood to mean both the astigmatism of the spectacle lens (as surface power or in the wearing position) and the astigmatic error. Moreover, the term "target astigmatism distribution" within the scope of this application is understood to mean both the spatial distribution of the target values of the astigmatism of the spectacle lens and the spatial distribution of the target values of the astigmatic error. The target values of the at least one optical property of the spectacle lens and in particular the target values of the astigmatism or the astigmatic error characterized the "design" of a spectacle lens. In addition, the spectacle lens design can comprise a suitable object distance model. The object distance model may comprise an object distance function, which is defined as the reciprocal object distance along the main line of sight. A standardized object distance model is indicated in DIN 58 208 part 2 (cf. image 6), for example. However, the object distance model may be different from this standardized object distance model.

The target astigmatism distribution, on the basis of which the progressive spectacle lens is optimized, can be obtained by means of a transformation of an existing or predetermined design (starting design, base design). For example, DE 10 2008 015 189 suggests obtaining target astigmatism distributions for different additions by means of a transformation of a predetermined base or starting target astigmatism distribution, which has been defined for a predetermined base addition. DE 10 2009 005 206 or DE 10 2009 005 214 suggest creating target astigmatism distributions with different widths of the distance and/or near zone(s) from a predetermined target astigmatism distribution by means of manipulation of a predetermined base target astigmatism line. The power dependency of the target astigmatism can be satisfied with different base designs.

The starting design (base design) usually exhibits an almost symmetric distribution of the target astigmatism with respect to the main line of sight due to the binocular image formation properties. In an addition and/or power and/or progression length-dependent transformation of the starting design, the almost symmetric distribution of the target astigmatism is substantially maintained.

However, according to a first aspect of the invention, it has been found that for certain combinations of prescription values and/or parameters of the spectacle lens and/or its arrangement in front of the eyes of the spectacles wearer (i.e. is wearing position), the above-described procedure, in which the target astigmatism distribution taken into account in the target function is almost symmetric with respect to the main line of sight, can lead to suboptimal results. For example, the gradients of the surface properties of the progressive surface and/or the gradients of the "as worn" power are often relatively large. This results in deteriorated wearing position properties of the spectacle lens (astigmatism and/or refractive power in wearing position of the spectacle lens).

These disadvantages arise particularly in the case of spectacle lenses having a flat base curve (i.e. a base curve in the range of 0 dpt to 4 dpt) and higher back surface curvatures (i.e. back surface curvatures equal to or greater than −6 dpt), especially in combination with:

high prescription cylinders, i.e. cylinders in the range of equal to or greater than 2 dpt, and/or
oblique cylinders axis positions of the prescription cylinder, i.e. cylinder axis positions of the prescription cylinder from 0 to 90° according to TABO (technical committee for eyewear optics) for right spectacle lenses, and from 90 to 180° for left spectacle lenses; and/or
a small prescription addition, i.e. an addition of <2.0 dpt, preferable and addition of ≤1.5 dpt,
and/or in combination with larger tilt angles of the spectacle lens in front of the eye, i.e. tilt angles in the range equal to or larger than 5°.

It has been found that one reason for the occurrence of higher gradients of the surface properties for spectacle lenses exhibiting one of the above combinations is the systematic distribution of the target astigmatism with respect to the main line of sight. For example, in the case of a toric overlay of a predetermined starting surface with a toroidal or atoroidal surface, an astigmatic error may occur temporally, which is partly clearly below the value of the target astigmatism according to the symmetric target astigmatism distribution. However, the optimization process tries to achieve the symmetric objectives for the target astigmatism and therefore "bends" the surface to be optimized more strongly at this point as would be required for low additions.

According to the first aspect of the invention, it is therefore suggested that the temporal target astigmatism in the periphery of the spectacle lens be multiplied by a factor k to take these facts into account. The factor k will preferably have the value 1 if the target astigmatism values are not to be manipulated, and a value of smaller than 1 if the target astigmatism values are to be manipulated. The factor k is a function of at least one prescription value (such as sphere, cylinder, cylinders axis, prism, prism base and/or addition) and/or of at least one parameter of the spectacle lens or its arrangement in front of the eyes of the spectacles wearer (i.e. its wearing position). The parameters of the spectacle lens and/or its arrangement in front of the eyes of the spectacles wearer (i.e. its wearing position) are e.g. the face form angle, the tilt angle, the corneal vertex distance (CVD), forward inclination or pantoscopic angle, the interpupillary distance, the ocular center of rotation distance and/or other parameters. These may be average values (as defined in DIN 58 208 part 2, for example) or values determined individually for a specific spectacles wearer.

Specifically, it is suggested that the maximum temporal target astigmatism $\max\_Ast_{target}\_temporal_{start}$ (which usually occurs in the periphery of the spectacle lens) of the predetermined starting target astigmatism distribution $Ast_{target,start}$ be multiplied by a factor k, whereby a new, transformed, maximum temporal astigmatism $\max\_Ast_{target}\_temporal_{new}$ results:

$$\max\_Ast_{target}\_temporal_{new} = k * \max\_Ast_{target}\_temporal_{start} \quad (3)$$

The starting target astigmatism distribution $Ast_{start}$ across the spectacle lens can be the target astigmatism distribution of a predetermined progressive starting surface. Alternatively, it is possible to specify a target astigmatism model on the basis of which the starting target astigmatism distribution can be calculated. The target astigmatism model may be the target astigmatism model described in DE 10 2008 015 189, DE 10 2009 005 206, or DE 10 2009 005 214. In particular, the course of a main line and the course of at least one base target isoastigmatism line can be specified parametrically or numerically. All target astigmatism values between the main line and the base target isoastigmatism line as well as all target astigmatism values between the base target isoastigmatism line and the periphery of the spectacle lens can be determined subsequently by means of a suitable interpolation (e.g. a linear, quadratic, cubic interpolation) of the predetermined target astigmatism values on the main line and the base target isoastigmatism line, and optionally other predetermined values, as described in DE 10 2009 005 206 or DE 10 2009 005 214.

In a next step, a new, transformed target astigmatism distribution $\text{Ast}_{target_{new}}$ is determined on the basis of the new, transformed, maximum temporal astigmatism. Here, preferably, the nasal target astigmatism values or the nasal target astigmatism distribution remain unchanged.

The new, transformed target astigmatism distribution $\text{Ast}_{target_{new}}$ can be obtained by multiplying all temporal values of the target astigmatism (i.e. all target astigmatism values on the temporal side of the main line of sight) by the factor k:

$$\text{Ast}_{target_{new}}\_\text{temporal} = k*\text{Ast}_{target_{start}}\_\text{temporal}. \quad (4)$$

According to a preferred embodiment, however, a new, transformed target astigmatism distribution $\text{Ast}_{target_{new}}$ is obtained by means of an interpolation of the target astigmatism values between a predetermined temporal base target isoastigmatism line (usually the 0.5 dpt base target isoastigmatism line) and the periphery of the spectacle lens, wherein the modified value of the maximum temporal astigmatism $\max\_\text{Ast}_{target}\_\text{temporal}_{new}$ is taken into consideration. The documents DE 10 2009 005 206 or DE 10 2009 005 214 each describe a method (parallel curve model method or truncated cone model method) for calculating a target astigmatism distribution on the basis of a predetermined base target isoastigmatism line and the maximum, temporal astigmatism. The predetermined 0.5 dpt base target isoastigmatism line can be determined on the basis of the starting target astigmatism distribution. Here, preferably, the temporal target astigmatism values between the main line and the temporal base target isoastigmatism line remain unchanged. In addition to a low value of the maximum temporal target astigmatism, the new, transformed target astigmatism distribution usually exhibits smaller gradients of the target astigmatism in the periphery.

Preferably, transforming the starting target astigmatism distribution $\text{Ast}_{target_{start}}$ on the basis of the modified maximum temporal astigmatism $\max\_\text{Ast}_{target}\_\text{temporal}_{new}$ consequently comprises an interpolation of the target astigmatism values between a predetermined base target isoastigmatism line and the periphery of the spectacle lens taking the modified maximum temporal astigmatism $\max\_\text{Ast}_{target}\_\text{temporal}_{new}$ into account.

The optimization objectives for the spectacle lens, including the starting target astigmatism distribution and the transformed target astigmatism distribution $\text{Ast}_{target_{new}}$, can be indicated in a suitable coordinate system.

An exemplary coordinate system is a coordinate system in the object-side or eye-side surface of the spectacle lens to be optimized, wherein the origin of the coordinate systems e.g. coincides with the geometric center of the raw-round spectacle lens or with the centration or fitting point of the spectacle lens. The vertical ("y") and horizontal ("x") axes lie in the tangential plane with respect to the respective eye-side or object-side surface of the spectacle lens in the geometric center or the centration or fitting point. The vertical direction preferably refers to the vertical direction in the wearing position of the spectacle lens, wherein the spectacle lens is for example arranged in an average wearing position (as defined e.g. in DIN 58 208 part 2) or in an individual wearing position. Preferably, the spectacle lens is arranged in an individual wearing position. In this coordinate system, $\text{Ast}_{target_{start}} = \text{Ast}_{target_{start}}(x,y)$ and $\text{Ast}_{target_{new}} = \text{Ast}_{target_{new}}(x,y)$ apply.

Of course, it is possible to indicate the spatial distribution of the aberrations in other suitable coordinate systems.

It is particularly preferred to indicate the target astigmatism values and the optimization values in the coordinate system of the surface to be optimized with respect to the main line or the main line of sight (where u=0 applies on the main line/main line of sight), and not with respect to the y axis (x=0), i.e. in the form $\text{Ast}_{target_{start}} = \text{Ast}_{target_{start}}(u,y)$, $\text{Ast}_{target_{new}} = \text{Ast}_{target_{new}}(u,y)$. If the target values or optimization values are specified with respect to the main line, it will be sufficient, in the case changing the wearing position of the spectacle lens to be taken into consideration, and in particular in the case of changing the interpupillary distance, the corneal vertex distance, the forward inclination, the object distance model, etc., to merely match the main line to the modified main line of sight. The target values or optimization target values are automatically adjusted then.

The factor k, which is also referred to as a multiplication factor, can be calculated as follows:

$$k = (1 - g_{prescription} - h), \quad (5)$$

where
$g_{prescription}$ is a function of at least one prescription value, and
h is a function of at least one (individual) parameter of the spectacle lens or its arrangement in front of the eyes of the spectacles wearer.

Since the above-mentioned disadvantages increasingly occur in spectacle lenses having a flat base curve and a curved back surface, these two parameters (i.e. base curve and/or curvature of the back surface) can preferably be taken into consideration by means of an asymptotic prefactor v:

$$k = v*(1 - g_{prescription} - h), \quad (6)$$

where
$g_{prescription}$ is a function of at least one prescription value;
h is a function of at least one parameter of the spectacle lens or its arrangement in front of the eyes of the spectacles wearer; and
v is a prefactor, which is a function of the prescription, in particular of the distance prescription (or the prescription in the distance reference point), and/or of the base curve of the spectacle lens and/or of the curvature of the back surface of the spectacle lens.

For example, the asymptotic prefactor v can be specified such that the manipulation factor k is only applied for minus-power, or negative, lenses.

The prefactor v can be a double asymptote function of the distance prescription and/or of the base curve of the spectacle lens and/or of the curvature of the back surface of the spectacle lens. For example, the prefactor v can be realized by means of a double asymptote function of the form:

$$v = b + \frac{a}{(1 + e^{c(x+d)^m})} \quad (7)$$

where for x, the medium power or the sphere of the distance prescription can be put. For negative selected c, the value b corresponds to the factor k, and (b+a)=1.0, so that:

$$v = b + \frac{a}{(1 + e^{c(x+d)^m})} = k + \frac{1-k}{(1 + e^{c(x+d)^m})} \quad (7a)$$

However, it is conceivable to describe the dependency of the prefactor on the distance portion prescription and/or the base curve and/or the curvature of the back surface by means of other suitable functions.

Preferably, the function $g_{prescription}$ is a function of the prescription astigmatism and/or of the prescribed cylinder axis and/or of the prescribed addition. The prescription astigmatism, the prescribed cylinder axis, and the prescribed addition are the predetermined values that are determined by means of refraction determination carried out by an optometrist or eye doctor. Accordingly, the method preferably comprises the step of obtaining the prescription values, in particular the prescription astigmatism, and/or the prescribed cylinder axis, and/or the prescribed addition.

Preferably, the dependency of the function $g_{prescription}$ on the cylinder axis position is described by the factor (by the function) $f_{(cylinder\ axis)}$:

$$f_{(cylinder\ axis\ position)} = a^* \sin^3(2^* \text{cylinder axis position}), \quad (8)$$

where the parameter a is preferably in the range from 0.05 to 1.0, further preferably in the range from 0.3 to 0.6, and particularly preferably takes on the value 0.4.

The dependency of the function $g_{prescription}$ on the prescription astigmatism is preferably described by the factor (by the function) $f_{(prescription\ astigmatism)}$:

$$f_{(prescription\ astigmatism)} = \frac{\text{prescription astigmatism}}{b}, \quad (9)$$

where the parameter b is preferably in the range from 2 to 6, and further preferably in the range from 4 to 6. Particularly preferably, b takes on the value of the maximum prescription astigmatism.

Preferably, the function $g_{prescription}$ is a linear function of the addition, wherein the dependency of the function $g_{prescription}$ can be described by the factor or by the function $f_{(addition)}$:

$$f_{(addition)} = c^* \text{addition} + d, \quad (10)$$

The straight line of the addition is preferably selected such that no adjustment takes place for the maximum prescription addition (i.e. $f_{(addition_{max})} = 0$) and that with the smallest permissible addition $f_{(addition_{min})} = 1.0$ applies. Preferably, the straight line parameter c is in the range between 0 and −1, and further preferably in the range between 0.75 and −0.3. Particularly preferably, c takes on a value of −0.3636. Preferably, the parameter d is in the range from 2.0 to 0, further preferably in the range between 2 and 1. Particularly preferably, d takes on the value of 1.2727.

The function $g_{prescription}$ is preferably obtained by multiplying at least two of the factors or functions $f_{(cylinder\ axis)}$, $f_{(prescription\ astigmatism)}$, and $f_{(addition)}$, preferably by multiplying all three factors.

Preferably, h is a function of the tilt angle of the spectacle lens ($h = f_{(tilt\ angle)}$), preferably a function of the form:

$$f_{(tilt\ angle)} = \frac{\text{tilt angle}}{g}, \quad (11)$$

where g is a predetermined constant. Since the influence of the tilt angle is not very great, g is preferably in the range of 50 to 500, further preferably in the range from 100 to 300, and particularly preferably the value is approximately 200.

The tilt angle is the angle that is enclosed by the horizontal tangent of the object-side surface of the spectacle lens at a predetermined reference point and a horizontal straight reference line. The predetermined reference point is the intersection of the eye-side horizontal main ray in the wearer's zero direction of sight with the object-side surface of the spectacle lens. The horizontal straight reference line is in a plane perpendicular to the horizontal main ray in the wearer's zero direction of sight. With regard to the definition and the determination of the tilt angle, reference is made to DE 10 2004 059 448 A1 (referred to as a "horizontaler Kippwinkel"/Engl.: horizontal angle of tilt/). The tilt angle is one of the parameters of the arrangement of the spectacle lens in front of the eyes of the spectacles wearer.

Instead of the tilt angle, h can be a function of the face form angle (FFA), preferably a function of the form:

$$h = f_{(FSW)} = \frac{FSW}{g}. \quad (12)$$

Moreover, other individual or average parameters of the wearing position of the spectacle lens, such as forward inclination, can also be taken into account.

Preferably, the factor k is calculated depending on the cylinder axis position, the prescription astigmatism, the addition, and the tilt angle or the face form angle:

$$k = 1 - f_{(cylinder\ axis\ position)} * f_{(prescription\ astigmatism)} * f_{(addition)} - f_{(tilt\ angle)} \quad (13)$$

or $$k = v^* (1 - f_{cylinder\ axis\ position} * f_{prescription\ astigmatism} * f_{(addition)} - f_{(tilt\ angle)} \quad (14)$$

wherein the individual factors or functions $f$ are each calculated according to equations (8) to (12).

An advantage of a factor k calculated according to formulae (13) or (14) is that the factor k will automatically take on a value of 1 if no transformation of the starting target astigmatism distribution is to take place.

Preferably, the factor k is only applied for prescription cylinder axis positions of 0 to 90° according to TABO with indication in plus cylinder notation for right lenses, for left lenses in the case of cylinder axes of 90 to 180°. With cylinder axis positions in these ranges, the above-described disadvantages occur increasingly. If the cylinder axis positions are in the other quadrants, the spectacle lens can be optimized on the basis of the conventional method (e.g. on the basis of the method disclosed in DE 10 2008 015 189) thus taking a symmetric target astigmatism objectives into account.

After scaling of the temporal astigmatism, the target astigmatism values can optionally be scaled or transformed further. For example, the progression length can depend on the addition by analogy with $f_{(Addition)}$, as described in DE 10 2008 015 189. The target astigmatism values can also be scaled depending on the addition, as described in DE 10 2008 015 189, for example. The order of the different scalings/transformations of the starting target astigmatism distribution can vary as well.

As explained above, the optimization of the spectacle lens on the basis of the transformed target astigmatism distribution can comprise a minimization of a target function in which the values of the previously determined transformed target astigmatism distribution are taken into account as target values. Preferably, the optimization of the spectacle lens on the basis of the transformed target astigmatism distribution comprises a minimization of a target function of the form:

$$F(\vec{x}) = \sum_{i=1}^{m} [g_{i,Ast}(Ast_i - Ast_{i,target_{new}})^2 + \ldots], \quad (15)$$

where
$Ast_{i,target_{new}}$ is the target astigmatism value of the transformed target astigmatism distribution $Ast_{target_{new}}$ at the $i^{th}$ evaluation point;
$Ast_i$ is the actual local astigmatism at the $i^{th}$ evaluation point; and
$g_{i,Ast}$ is the local weighting of the target astigmatism value at the $i^{th}$ evaluation point In the above formula, $Ast_{i,target_{new}}$ is the previously determined, transformed target astigmatism distribution $Ast_{target_{new}}$ at the $i^{th}$ evaluation point.

Further preferably, the refractive error/refractive power $\Delta R$ is also taken into account in the target function, so that calculating and optimizing the spectacle lens comprises minimizing the target function:

$$F(\vec{x}) = \quad (16)$$
$$\sum_{i=1}^{m} [g_{i,\Delta R}(\Delta R_i - \Delta R_{i,target_{new}})^2 + g_{i,Ast}(Ast_i - Ast_{i,target_{new}})^2 + \ldots]$$

where
$\Delta R_{i,target_{new}}$ is the target value of the local refractive error/refractive power at the $i^{th}$ evaluation point;
$\Delta R_i$ is the actual value of the local refractive error/refractive power at the $i^{th}$ evaluation point; and
$g_{i,\Delta R}$ is the local weighting of the refractive error/refractive power at the $i^{th}$ evaluation point.

Similar to the target astigmatism distribution, the distribution of the target refractive power or of the target refractive error can be determined from a starting target astigmatism distribution or a starting target refractive error distribution and be modified by multiplication by a factor. The distribution of the target refractive power or of the target refractive error can also be determined on the basis of the previously determined modified target astigmatism distribution.

The optimization of the spectacle lens is preferably performed in the wearing position of the spectacle lens. In the optimization process of the spectacle lens, in addition to the individual prescription values (sph, cyl, axis, add, prism, base), parameters of the individual position or arrangement of the spectacle lens in front of the spectacles wearer's eye (e.g. corneal vertex distance (CVD), face form angle (FFA), forward inclination or pantoscopic angle), and/or physiological parameters of the spectacles wearer (e.g. pupillary distance) are preferably taken into account as well. Alternatively, average parameters of the position or arrangement of the spectacle lens in front of the eye of the spectacles wearer and/or average physiological parameters of the spectacles wearer can be taken into account. The progressive spectacle lens can be optimized and calculated "online" as one-of-a-kind after receipt of order.

Preferably, the method comprises the further steps of:
obtaining the prescription values of the spectacle lens; and
obtaining the preferably individual parameters of the spectacle lens and/or the arrangement of the spectacle lens in front of the eyes of the spectacles wearer.

With the above-described procedure according to the first aspect of the invention, it is possible to manipulate the target astigmatism distribution required for the optimization on the basis of target functions for specific powers in an existing progressive spectacle lens design (starting design, base design) such that the objectives can be achieved more easily. Thus, the negative effects on the optimized surface and wearing position properties of disadvantageous target value objectives can be reduced clearly. This directly improves the wearing position properties.

The method and the corresponding device according to the first aspect of the invention are suitable both for creating designs and design variants for conventional or power-optimized progressive spectacle lenses and for creating designs and design variants for individually optimized progressive spectacle lenses.

As explained above, the optimization of progressive spectacle lenses is usually performed by minimizing a target function in which required or target values for at least one optical parameter (e.g. astigmatism and/or refractive power) or required or target values for at least one aberration (e.g. astigmatic error or astigmatic deviation and/or refractive error) of the progressive spectacle lens are taken into account. The required or target values of the at least one optical property or the at least one aberration, which are taken into account in the target function, characterize the design of a spectacle lens. In addition, the spectacle lens design can comprise a suitable object distance model. The object distance model may comprise an object distance function, which is defined as the reciprocal object distance along the main line of sight. A standardized object distance model is indicated in DIN 58 208 part 2 (cf. image 6), for example. However, the object distance model may be different from this standardized object distance model.

A main line of sight is understood to be the sequence of the penetration points of the main rays through the respective spectacle lens surface when looking at a line lying in the perpendicular plane that splits the distance of the two ocular centers of rotation in half (so-called cyclopean eye plane). The spectacle lens surface can be the object-side or the eye-side surface. The position of the line in the cyclopean eye plane is determined by the selected object distance model.

A main line is understood to be a substantially straight or curved line along which the desired increase of the refractive power of the spectacle lens from the distance portion to the near portion is achieved. The main line is substantially centered with respect to the spectacle lens top down, i.e. along a substantially vertical direction. Thus, the main line constitutes a construction line in the coordinate system of the object-side or eye-side surface to be optimized for the description of the target values. The course of the main line of the spectacle lens is selected such that it at least approximately follows the main line of sight. A method for adjusting the main line to the main line of sight is described in EP 1 277 079 A2, for example.

The object distance function (i.e. the reciprocal object distance on the main line of sight) plays an essential role in the design specification and optimization of progressive spectacle lenses. For example, according to the Minkwitz theorem, in the case of a fullcorrection to the greatest possible extent, the basic characteristic of a progressive spectacle lens in the surrounding of the main line of sight is mainly determined by the course of the object distance function $A_1(y)$ along the main line of sight.

It is a further object of the invention to provide an efficient and quick method for an automatic adjustment of the object distance function to changed object distances or to a modified object distance model.

According to a second aspect of the invention, a computer-implemented method for optimizing a progressive spectacle lens is proposed, the method comprising the steps of:

specifying a starting object distance function $A_{1G}(y)$ obtaining object distance data, wherein the object distance data comprises an object distance in at least one predetermined point on the main line of sight;

modifying or transforming the starting object distance function depending on the obtained object distance data; and optimizing the progressive spectacle lens, wherein in the optimization process of the spectacle lens the modified/transformed object distance function is taken into account.

Modifying/Transforming the starting object distance function $A_{1G}(y)$ comprises overlaying the starting object distance function $A_{1G}(y)$ with a correction function $A_{1corr}(y)$:

$$A_1(y) = A_{1G}(y) + A_{1corr}(y). \quad (17)$$

The object distance function represents the reciprocal object distance (the reciprocal object separation) along the main line of sight as a function of the vertical coordinate y. Put differently, the object distance function is defined as the reciprocal object distance (the reciprocal object separation) along the main line of sight.

The correction function includes at least one variable parameter, which is determined depending on the obtained object distance data such that the value of the modified starting object distance function, in at least one predetermined point, is equal to the reciprocal value of the obtained target object distance for this point. In other words, the at least one variable parameter (coefficient) of the correction function is determined or set depending on the obtained object distance data such that the condition $$A_1(y=y_D) = A_{1D}, \quad (18)$$

is met, wherein in the above formula:

$A_{1D}$ is the reciprocal value of the obtained target object distance or the obtained target object separation in the at least one predetermined point D on the main line of sight, wherein the point D has a vertical coordinate $y_D$; and $A_1(y=y_D)$ is the value of the object distance function $A_1(y)$ in the predetermined point D on the main line of sight.

Here, the coordinate system can be an arbitrary coordinate system, in particular one of the above-described coordinate systems {x,y} or {u,y}, where u designates the distance from the main line of sight or main line. In a coordinate system {x,y}, $(x=x_{HBL}=x_0,y)$ applies for the points on the main line of sight (HBL). In a coordinate system {u,y} of the main line of sight, (u=0,y) applies for the points on the main line of sight.

Preferably, the object distance data comprises at least one target object distance $A_{1distance}$ in a predetermined distance reference point (design point distance) DF on the main line of sight and a target object distance $A_{1near}$ in a predetermined near reference point (design point near) DN on the main line of sight. The at least one variable parameter of the correction function is determined or set such that the respective value of the modified starting object distance function in the distance and/or near reference point(s) is equal to the corresponding reciprocal value of the detected target object distance for the distance and/or near reference point(s).

Put differently, in this case, the object distance data comprises a target object distance for the distance reference point DF and a target object distance for the near reference point DN. The distance reference point is located on the main line of sight at a vertical height $y_{DF}$. The near reference point is located on the main line of sight at a vertical height $y_{DN}$. The at least one variable parameter of the correction function is set such that the conditions $$A_1(y=y_{DF}) = A_{1distance},$$

$$A_1(y=y_{DN}) = A_{1near} \quad (19)$$

are met, where $A_{1distance}$ is the reciprocal value of the target object distance in the distance reference point DF, and $A_{1near}$ is the reciprocal value of the target object distance in the near reference point DN.

The starting object distance function, hereinafter referred to as a basic object distance function or basic function, $A_{1G}(y) = A_{1G}(x=x_0,y) = A_{1G}(u=0,y)$ can be an arbitrary analytical function or also an interpolation function (e.g. spline function). Also, $A_{1G}(y)$ can be specified point by point.

For example, the starting object distance function can be described analytically by means of a double asymptote function of the form:

$$A_{1G}(y) = DAS_G(y) = b_G + \frac{a_G}{(1 + e^{c(y+d)})^m} \quad (20)$$

with the parameters/variables $a_G, b_G, c, d, m$.

Particularly, a double asymptote function has the following advantageous properties:

The two asymptotes respectively take on the values $b_G$ and $(b_G + a_G)$;

The vertical position can be controlled with the variable parameter d. Preferably, the parameter d is in the range of $-10<d<10$, further preferably in the range of $-8<d<5$;

The larger the value of the variable parameter c, the faster the transition from asymptote to the other. The parameter c is preferably selected such that $|c|<1.5$;

The parameter m (m>0) describes the asymmetry of the function. For m=1, the double asymptote function has a point symmetry with a center y=−d. Preferably, the parameter m is in the range of $0.2<m<2$, further preferably in the range of $0.4<m<1$;

If the negative sign (c<0) is selected for the parameter c, it will hold that:

near portion asymptote $A_{1G}(y \to -\infty) = A_{1Gnear} = b_G$; and distance portion asymptote $A_{1G}(y \to +\infty) = A_{1distance} = (b_G + a_G)$.

Usually, the starting object distance function $A_{1G}(y)$, which is assigned to the starting design (base design), is specified such that the object distances in the distance reference point DF and in the near reference point DN (design points distance and near) approximately correspond to the standard object distances $A_{1Gdistance}$ and $A_{1Gnear}$ i.e. the target object distances in the distance and near reference points according to a standard object distance model. Consequently, the parameters $a_G, b_G$ can be determined automatically on the basis of the standard objectives for the reciprocal object distances $A_{1Gdistance}$ and $A_{1Gnear}$ in the distance and near reference points DF and DN. A standard object distance model is e.g. indicated in DIN 58 208 part 2.

If a spectacles wearer selects deviating object distances $A_{1distance}$ and $A_{1near}$ in the distance and/or near reference point(s), the starting object distance function will be overlaid with a correction function in order to take this modification into account.

The correction function $A_{1corr}(y)$ may be a double asymptote function of the form $$A_{corr}(y) = DAS_{corr}(y) = b_{corr} + \frac{a_{corr}}{(1 + e^{c_{corr}(y+d_{corr})})^{m_{corr}}}$$

with the parameters (coefficients) $a_{corr}$, $b_{corr}$, $c_{corr}$, $d_{corr}$, $m_{corr}$;

a linear function of the starting object distance function $A_{1corr}(y)=c+mA_{1G}(y)$ with the parameters (coefficients) c and m; or a different suitable function.

Alternatively or in addition, the starting object distance function can be overlaid with other functions to e.g. obtain a desired modification of the design characteristics. For example, the starting object distance function can be overlaid with a function in the form of a Gaussian bell curve $$A_{1corr}(y) = A_{1Gauss}(y) = g(y) = g_a + g_b e^{-\frac{y-y_0}{\sigma}}$$

with the parameters (coefficients) $g_a, g_b, y_0, \sigma$.

At least one of the parameters of the correction function is variable and is determined or set depending on the obtained object distance data, in particular on the modified target values for the object distances in the distance and/or near reference point(s).

Preferably, the correction function is a double asymptote function of the form $$A_{corr}(y) = DAS_{corr}(y) = b_{corr} + \frac{a_{corr}}{(1 + e^{c_{corr}(y+d_{corr})})^{m_{corr}}} \quad (21)$$

with the parameters (coefficients) $a_{corr}, b_{corr}, c_{corr}, d_{corr}, m_{corr}$.

In this case, it holds that:

$$A_1(y) = A_{1G}(y) + DAS_{corr}(y) \quad (22)$$

The variable parameters/coefficients $b_{corr}$ and $a_{corr}$ of the correction function are determined or set depending on the obtained object distance data.

Preferably, both the starting object distance function and the correction function are double asymptote functions. Preferably, the correction function has the same parameters c, d and m as the parameters of the starting object distance function (i.e. $c=c_{corr}, d=d_{corr}, m=m_{corr}$). In this case, it holds that:

$$A_1(y) = A_{1G}(y) + DAS_{corr}(y) = \quad (23)$$

$$\left(b_G + \frac{a_G}{(1 + e^{c(y+d)})^m}\right) + \left(b_{corr} + \frac{a_{corr}}{(1 + e^{c(y+d)})^m}\right) =$$

$$(b_G + b_{corr}) + \frac{(a_G + a_{corr})}{(1 + e^{c(y+d)})^m}.$$

Thus, it can be ensured that the characteristic of the starting object distance function is substantially maintained in the case of an adjustment to changed object distances.

With the two conditions $A_1(y_{D_F})=A_{1distance}$ and $A_1(y_{D_N})=A_{1near}$, the two coefficients $b=(b_G+b_{corr})$ and $a=(a_G+a_{corr})$ and thus also the coefficients $b_{corr}=(b-b_G)$ and $a_{corr}=(a-a_G)$ of the correction function are clearly determined.

The coefficients/parameters of the starting object distance function (basic function) and the coefficients/parameters of the correction function can be determined in advance and preferably be stored separately as data files in a memory. This allows a simple reproduction and modification of the values of the starting design later on.

As explained above, the starting object distance function, which may in particular be a double asymptote function, can alternatively or in addition to an overlay with a correction function $A_{1corr}(y)$ be overlaid with a function in the form of a Gaussian bell curve $$A_{1Gauss}(y) = g(y) = g_a + g_b e^{-\frac{y-y_0}{\sigma}}$$

with the parameters/coefficients $g_a, g_b, y_0, \sigma$:

$$A_1(y) = A_{1G}(y) + A_{1Gauss}(y) = A_{1G}(y) + \left(g_a + g_b e^{-\frac{y-y_0}{\sigma}}\right). \quad (24)$$

In case that the starting object distance function is a double asymptote function, it holds that:

$$A_1(y) = A_{1G}(y) + A_{1Gauss}(y) = \left(b \frac{a}{(1 + e^{c(y+d)})^m}\right) + \left(g_a + g_b e^{-\frac{y-y_0}{\sigma}}\right). \quad (25)$$

Due to the starting object distance function (basic function) being overlaid with a Gaussian bell curve (Gaussian function), the curve characteristic of the starting object distance function can be modified in a targeted manner. In particular, the Gaussian function has the effect that the object distance function is flatter above the Gaussian maximum. The refractive power change becomes less in this zone, the isoastigmatism lines move further outward, and the substantially deficit-free lens zone, e.g. the lens zone having an astigmatic error of smaller than 0.5 dpt, becomes wider. Thus, zones (e.g. the intermediate zone) can be given a higher or lower weighting in a targeted manner.

For example, from a uniform slow transition from the distance portion value of the object distance $A_{1Gdistance}$ to the near portion value of the object distance $A_{1Gnear}$ ($g_b \approx 0$), a different course of the object distance function $A_1(u=0,y)=A_1(y)$ ($A_1$-course) can be created for a lens for computer work ($g_b \neq 0, \sigma \neq 0$).

In one example, on the basis of a percentage weighting $g_G$ of the Gaussian function, where $g_G \in [0,100]\%$, the associated coefficient $g_b$ of the Gaussian function can be determined according to the specification of a maximum $A_1$-increase of the Gaussian function $g_{b\ max}$ (a design-specific specification):

$$g_b = \frac{g_G}{100} g_{bmax}. \quad (26)$$

With a 90% weighting of the Gaussian function and a maximum $A_1$-increase of the Gaussian function $g_{b\ max}=0.6$ dpt, a value of e.g. 0.54 dpt results for $g_b$.

The percentage weighting $g_G$ and the further coefficients of the Gaussian function can be specified for the respective base design or can be determined according to the method described WO 2010/084019 on the basis of a design polygon. Preferably, the parameter $g_a$ is in the range of $-1<g_a<1$, further preferably $g_a=0$. The parameter $y_0$ is preferably in the range of $-10<y_0<5$, further preferably in the range of $-5 < y_0 < 0$. The parameter σ is preferably in the range of $0 < \sigma < 15$, further preferably in the range of $5 < \sigma < 10$.

Overlaying the starting object distance function with a Gaussian bell curve can be independent of an overlay with a correction function, according to a further aspect.

According to a further example, the correction function $A_{corr}(y)$ is a linear function of the starting object distance function:

$$A_{corr}(y) = c + mA_{1G}(y) \quad (27)$$

with the parameters/coefficients c and m.

Thus, the modified object distance function also represents a linear function of the starting object distance function $A_{1G}(u=0,y) = A_{1G}(y)$:

$$A_1(y) = A_{1G}(y) + c + mA_{1G}(y) = c + (1+m)A_{1G}(y) \quad (28)$$

or in a short notation $$A_1 = A_{1G} + c + mA_{1G} = c + (1+m)A_{1G}. \quad (29)$$

Preferably, the straight line coefficients c and m are calculated from the deviations of the values of the starting object distance function $A_{1G}(y)$ from the obtained target values of the reciprocal object distance in the distance and near reference points. Put differently, a linear adjustment of the starting object distance function to the changed object distances in the distance and/or or near reference point(s) is performed.

Preferably, in this case, it holds for the coefficients c and m that:

$$c = \frac{\Delta A_{1F} A_{1G}(y_{DN}) - \Delta A_{1N} A_{1G}(y_{DF})}{A_{1G}(y_{DN}) - A_{1G}(y_{DF})} \quad (30)$$

$$m = \frac{\Delta A_{1N} - \Delta A_{1F}}{A_{1G}(y_{DN}) - A_{1G}(y_{DF})},$$

where
$\Delta A_{1F} = A_{1distance} - A_{1G}(y_{DF})$;
$\Delta A_{1N} = A_{1near} - A_{1G}(y_{DN})$;
$A_{1distance}$ is the reciprocal value of the target object distance in the distance reference point;
$A_{1near}$ is the reciprocal value of the target object distance in the near reference point; near;
$y_F$ is the vertical coordinate of the distance reference point; and
$y_N$ is the vertical coordinate of the near reference point.

The straight line coefficients c and m are calculated as follows, for example:

In a first step, the deviations of the values of the starting object distance function $A_{1G}(y)$ in the reference or design points DF (with the coordinates $(x=x_0, y_{DF})=(u=0, y_{DF})$) and DN (with the coordinates $(x=x_0, y_{DN})=(u=0, y_{DN})$) from the corresponding (individual) values $A_{1distance}$ and $A_{1near}$ of the reciprocal target object distance (the reciprocal target object separation) are determined for these points:

$$\Delta A_{1F} = A_{1distance} - A_{1G}(y_{DF});$$

$$\Delta A_{1N} = A_{1near} - A_{1G}(y_{DN}); \quad (31)$$

The straight line coefficients c and m can be calculated from the previously determined deviations as follows:

$$c = \frac{\Delta A_{1F} A_{1G}(y_{DN}) - \Delta A_{1N} A_{1G}(y_{DF})}{A_{1G}(y_{DN}) - A_{1G}(y_{DF})} \quad (32)$$

-continued $$m = \frac{\Delta A_{1N} - \Delta A_{1F}}{A_{1G}(y_{DN}) - A_{1G}(y_{DF})} \quad (32)$$

In the above formulae:
$A_{1G}(y)$ is the starting object distance function;
$A_{1distance}$ is the target value of the reciprocal object distance in the distance reference point (design point distance);
$A_{1near}$ is the target value of the reciprocal object distance in the near reference point (design point near); and
$A_1(y)$ is the corrected/adjusted object distance function.

By this adjusted object distance function, which is a linear function of the starting object distance function, the course of the reciprocal object distance along the main line of sight is not changed substantially. In particular, the slope or derivative of the basic function $A_{1G}(y)$ and of the modified/corrected object distance function $A_1(y)$ merely differ by the constant factor (1+m):

$$\frac{dA_1}{dy} = \frac{dA_{1G}}{dy} + m\frac{dA_{1G}}{dy} = \frac{dA_{1G}}{dy}(1+m) \quad (33)$$

Put differently, the first derivative of the starting object distance function is only changed by a factor (1+m). For example, in the case of a full correction to the greatest possible extent, the basic characteristic of a progressive spectacle lens in the surrounding of the main line of sight is mainly determined by the course of the object distance function $A_1(y)$ along the main line of sight (Minkwitz theorem). The linear adjustment of the starting object distance function makes it possible to maintain the design characteristic with negligible computing effort also in the case of an adjustment of the object distances to modified specifications in one or two points.

The above-described method can be applied irrespective of the course of the reciprocal object distance along the main line of sight. It is also possible to substantially maintain the characteristic of the object distance function along the main line of sight and at the same time vary the object distances in the design points/reference points depending on the design, or to adjust them to the needs and wishes of the spectacles wearer.

In this example, the starting object distance function (basic function) $A_{1G}(y)$ can be an arbitrary analytical function or also an interpolation function (e.g. spline function). Coefficients of the basic function do not have to be known or be changed. If $A_{1G}(y)$ is specified point by point or, as described in the patent application DE 10 2009 005 847.8, is changed before the optimization, this method will be particularly suitable for matching the object distance function to the individual target object distances in the design points or reference points.

The above-described transformations of the starting object distance function by overlaying the starting object distance function with a double asymptote correction function, by overlaying the starting object distance function with a Gaussian function, or by a linear adjustment can of course be combined with each other in an arbitrary order.

As explained above, the optimization of the spectacle lens on the basis of the transformed target astigmatism distribution can comprise a minimization of a target function in which target values for the target astigmatism and/or for the refractive error are taken into account (cf. equations (1) and (2) or equations (15) and (16)). The values taken into account in the target function can be the values of an asymmetric target astigmatism distribution ($Ast_{target_{new}}$) determined according to a preferred example of the invention. The target astigmatism distribution can also be an arbitrary, predetermined target astigmatism distribution, e.g. a target astigmatism distribution determined by means of the method disclosed in DE 10 2008 015 189, DE 10 2009 005 206, or DE 10 2009 005 214. The refractive power distribution of the spectacle lens, the target values of which are taken into account in the target function, is preferably a refractive power distribution that is determined taking a predetermined accommodation model of the eye of the spectacles wearer and the previously determined object distance function into consideration. The target refractive power distribution can e.g. be determined such that a substantially full correction (i.e. within the scope of tolerable residual errors) along the main line of sight is present with the spectacle lens. Put differently, the objects which are looked at during an eye movement along the main line of sight and the object distance of which is determined by the object distance function are optimally imaged in the eye's fovea.

Preferably, the spectacle lens is optimized in the wearing position of the spectacle lens. In the optimization process of the spectacle lens, in addition to the individual prescription values (sph, cyl, axis, add, prism, base), parameters of the individual position or arrangement of the spectacle lens in front of the spectacles wearer's eye (e.g. corneal vertex distance (CVD), face form angle (FFA), forward inclination or pantoscopic angle), and/or physiological parameters of the spectacles wearer (e.g. pupillary distance) are preferably taken into account as well. Alternatively, average parameters of the position or arrangement of the spectacle lens in front of the eye of the spectacles wearer and/or average physiological parameters of the spectacles wearer can be taken into account. The progressive spectacle lens can be optimized and calculated online as one-of-a-kind after receipt of order.

Preferably, the method comprises the further steps of:
obtaining the prescription values of the spectacle lens; and
obtaining the preferably individual parameters of the spectacle lens and/or the arrangement of the spectacle lens in front of the eyes of the spectacles wearer.

According to the invention, a computer program product, i.e. a computer program claimed in the patent category of a device, and a storage medium with a computer program stored thereon are provided, wherein the computer program is adapted, when loaded and executed on a computer, to perform a preferred method for optimizing a progressive spectacle lens according to the first or second aspects of the invention.

Moreover, according to one aspect, a device for optimizing a progressive spectacle lens is proposed, comprising optimizing means adapted to perform a calculation or optimization of the spectacle lens according to a preferred example of the method for optimizing a progressive spectacle lens according to the first and/or second aspect(s) of the invention.

Specifically, the device for optimizing a progressive spectacle lens comprises
storage means for storing a starting target astigmatism distribution $Ast_{target_{start}}$ for the progressive spectacle lens;
target astigmatism distribution calculating means adapted to determine a transformed target astigmatism distribution $Ast_{target_{new}}$ from the starting target astigmatism distribution; and
spectacle lens optimizing means adapted to optimize a progressive spectacle lens on the basis of the transformed target astigmatism distribution.

The target astigmatism distribution calculating means are adapted to perform a multiplication of the value of the maximum temporal target astigmatism max_$Ast_{target}$_temporal$_{start}$ of the starting target astigmatism distribution $Ast_{target_{start}}$ by a factor k:
max_$Ast_{target}$_temporal$_{new}$=k*max_$Ast_{target}$_temporal$_{start}$,
whereby a modified maximum temporal astigmatism max_$Ast_{target}$_temporal$_{new}$ results, wherein the factor k is a function of at least one prescription value and/or of at least one parameter of the spectacle lens or its arrangement in front of the eyes of the spectacles wearer; and
a transformation of the starting target astigmatism distribution $Ast_{target_{start}}$ on the basis of the modified maximum temporal astigmatism max_$Ast_{target}$ temporal$_{new}$.

The starting target astigmatism distribution $Ast_{target_{start}}$ can be stored in a memory permanently or temporarily. The target astigmatism distribution calculating means and the spectacle lens optimizing means can be implemented by means of correspondingly configured or programmed conventional computer, specialized hardware and/or computer networks or computer systems. It is possible for the same computer or the same computer system to be configured or programmed so as to perform both the calculation of a transformed target astigmatism distribution and the optimization of the spectacle lens on the basis of the transformed target astigmatism distribution. However, it is of course possible to perform the calculation of the transformed target astigmatism distribution and the calculation of the spectacle lens on the basis of the transformed target astigmatism distribution in separate computing units, for example in separate computer or computer systems.

The target astigmatism distribution calculating means and/or the spectacle lens optimizing means can be in signal communication with the memory by means of suitable interfaces, and in particular read out and/or modify the data stored in the memory. Moreover, the target astigmatism distribution calculating means and/or the spectacle lens optimizing means can preferably comprise an interactive graphical user interface (GUI), which allows a wearer to visualize the calculation of the transformed target astigmatism distribution $Ast_{target_{new}}$ and the optimization of the progressive spectacle lens and to control it optionally by changing one or more parameters.

Alternatively or in addition, the device for optimizing a progressive spectacle lens can comprise
object distance function specifying means adapted to specify or set a starting object distance function $A_{1G}(y)$,
object distance obtaining means adapted to obtain object distance data, wherein the object distance data comprises an object distance in at least one predetermined point on the main line of sight;
object distance function modifying means for modifying or transforming the starting object distance function depending on the obtained object distance data; and
spectacle lens optimizing means for optimizing the progressive spectacle lens, wherein in the optimization process of the spectacle lens the transformed object distance function is taken into account.

The object distance function represents the reciprocal object distance or the reciprocal object separation along the main line of sight as a function of the vertical coordinate y.

Modifying or transforming the starting object distance function $A_{1G}(y)$ comprises overlaying $A_1(y)=A_{1G}(y)+_{1corr}(y)$ of the starting object distance function $A_{1G}(y)$ with a correction function $A_{1corr}(y)$. The correction function includes at least one variable parameter, which is determined depending on the obtained object distance data such that the value of the modified starting object distance function, in at least one predetermined point, is equal to the reciprocal value of the obtained target object distance for this point.

The object distance function specifying means can comprise storage means in which the starting object distance function or the parameters of the starting object distance function, on the basis of which the starting object distance function can be reconstructed, can be stored permanently or temporarily. The object distance obtaining means can comprise at least one interactive graphical user interface (GUI), which allows a wearer to input and/or modify data concerning the desired object distances in at least one predetermined point.

The object distance function modifying means and the spectacle lens optimizing means can be implemented by means of correspondingly configured or programmed conventional computer, specialized hardware and/or computer networks or computer systems. It is possible for the same computer or the same computer system, which performs the calculation of a transformed object distance function (and optionally a transformed target astigmatism distribution) to be capable of performing also the optimization of the spectacle lens on the basis of the transformed object distance function. However, it is of course possible to perform the calculation of the transformed object distance function and the calculation of the spectacle lens on the basis of the transformed object distance function in separate computing units, for example in separate computer or computer systems.

The object distance function modifying means and the spectacle lens optimizing means can be in signal communication with each other by means of suitable interfaces.

The object distance function modifying means can also be in signal communication with the object distance function specifying means by means of suitable interfaces and in particular read out and/or modify the data stored in the storage means.

Further, the object distance function modifying means and/or the spectacle lens optimizing means can preferably each comprise interactive graphical user interfaces (GUI), which allow a wearer to visualize the calculation of the transformed object distance function and the optimization of the progressive spectacle lens and to control it optionally by changing one or more parameters.

According to a further aspect, a method for producing a progressive spectacle lens is proposed, comprising:
  optimizing the spectacle lens according to a preferred example of the method for optimizing a progressive spectacle lens according to the first and/or second aspect(s) of the invention,
  providing surface data of the calculated and optimized spectacle lens; and
  manufacturing the spectacle lens according to the provided surface data of the spectacle lens.

The spectacle lens can be manufactured or processed by means of CNC machines, by means of a casting process, a combination of the two processes, or according to a different suitable process.

Also, a device for producing a progressive spectacle lens is provided, comprising:
  optimizing means adapted to perform a calculation and optimization of the spectacle lens according to a preferred example of the method for optimizing a progressive spectacle lens; and
  processing means for finishing the spectacle lens.

The optimizing means can be the above-described device for optimizing a progressive spectacle lens.

As explained above, the processing means can e.g. comprise CNC machines for direct machining of a blank according to the determined optimization objectives. The finished spectacle lens can have a simple spherical or rotationally symmetric aspherical surface and a progressive surface, wherein the progressive surface is optimized taking an individual object distance function and/or a (asymmetric) target astigmatism distribution as well as, optionally, individual parameters of the spectacles wearer into account. Preferably, the spherical or rotationally symmetric aspherical surface is the front surface (i.e. the object-side surface) of the spectacle lens. Of course, it is also possible to arrange the surface optimized on the basis of the calculated design as the front surface of the spectacle lens. It is also possible that both surfaces of the spectacle lens are progressive surfaces. Further, it is possible to optimize both surfaces of the spectacle lens.

The device for producing a progressive spectacle lens can further comprise obtaining means for
  obtaining the prescription values of the spectacle lens; and
  obtaining the (individual) parameters of the spectacle lens and/or of the arrangement of the spectacle lens in front of the eyes of the spectacles wearer.

Alternatively or in addition, the device for producing a progressive spectacle lens can further comprise obtaining means for obtaining object distance data. The obtaining means can in particular comprise graphical user interfaces.

Moreover, there is proposed a progressive spectacle lens produced according to a preferred production method, as well as a use of a progressive spectacle lens, produced according to a preferred production method, in a predetermined average or individual wearing position of the spectacle lens in front of the eyes of a specific spectacles wearer, for correcting a visual defect of the spectacles wearer.

With the proposed procedure for modifying the object distance function according to a preferred example, it is possible to adjust a predetermined starting object distance function, which e.g. corresponds to a standard object distance model, quickly and with comparatively little computing effort to a model for the object distances (object separations), which is different from the standard object distance model. Moreover, it is possible to change the characteristics of the starting object distance function in a targeted manner and to thus create object distance functions for different spectacle lens designs.

BRIEF DESCRIPTION OF THE DRAWINGS

Further objects, features, and advantages of the present invention will become apparent from the following detailed description of exemplary and preferred embodiments of the present invention with reference to the drawings, which show:

FIGS. 15A-15H an example of an adjustment of a starting object distance function to a modified object distance model, wherein FIG. 15A is a further exemplary starting object distance function;

FIG. 15B is the slope of the starting object distance function;

FIG. 15C is an exemplary Gaussian function;

FIG. 15D is the slope of the Gaussian function;

FIG. 15E is the object distance function obtained by overlaying the starting object distance function with the Gaussian function;

FIG. 15F is the slope of the object distance function;

FIG. 15G is the object distance function modified by linear adjustment; and

FIG. 15H is the slope of the object distance function modified by linear adjustment;

FIGS. 16A-16C an example of a graphical user interface for visualizing and modifying the object distance function, wherein FIG. 16A is a portion for visualizing a starting object distance function;

FIG. 16B is a portion for visualizing and changing the parameter of a correction function;

FIG. 16C is a portion for visualizing the modified starting object distance function;

FIGS. 17A-17D a further example of an adjustment of a starting object distance function to a modified object distance model, wherein FIG. 17A is a further exemplary starting object distance function;

FIG. 17B is the slope of the starting object distance function;

FIG. 17C is the new object distance function obtained by linear adjustment;

FIG. 17D is the slope of the new object distance function;

On the abscissa of FIGS. 14A to 17D, the vertical coordinate y of the main line of sight is plotted in mm. On the ordinate of FIGS. 14 to 17, the reciprocal object distance (reciprocal object separation) is plotted in dpt. The coordinate system is the above-described coordinate system $\{u,y\}$.

DETAILED DESCRIPTION

Figure 1:
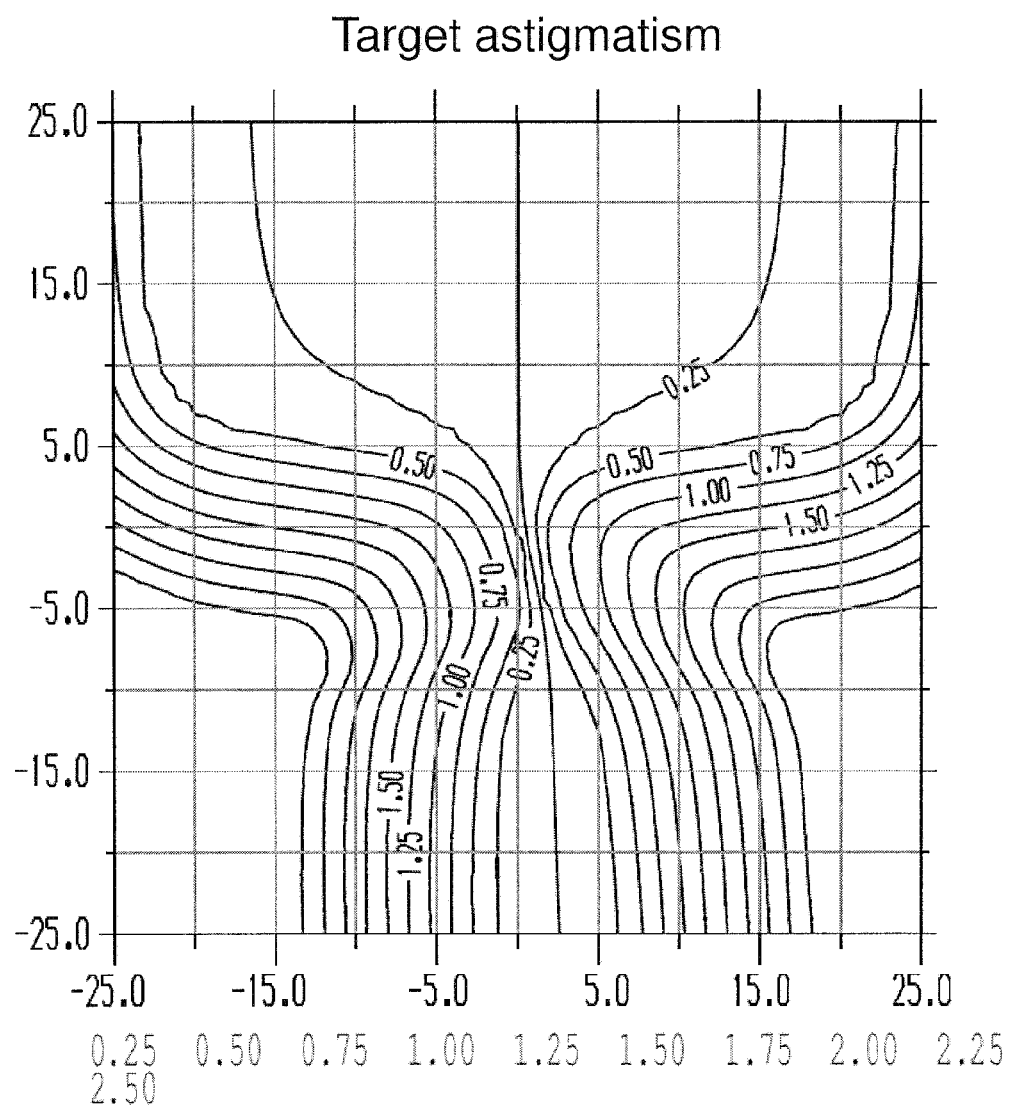
FIG. 1 starting target astigmatism distribution for an addition of 2.5 dpt.

FIG. 1 shows the starting target astigmatism distribution based on a predetermined starting surface for an addition of 2.5 dpt. The maximum astigmatism for the periphery is 2.6 dpt. Based on the starting target astigmatism distribution, a spectacle lens with the following prescription values and parameters is to be calculated: sphere (sph)=−5.0 dpt; cylinder (cyl)=0.0 dpt; addition (add)=2.5 dpt; base curve (BC)= 3.0 dpt; refractive index n=1.579. The spectacle lens is calculated in a wearing position with the parameters: corneal vertex distance (CVD)=13 mm; forward inclination (FI)=7°; interpupillary distance (ID)=64 mm; Y tilt angle=0°.

In one example, a factor k=0.58 is determined depending on the prescription data of the spectacle lens (in particular the prescription astigmatism, the prescribed axis of the prescription astigmatism, and the prescribed addition) and the tilt angle of the spectacle lens (cf. equations (7) to (13)). The factor k=0.58 is multiplied by the maximum temporal astigmatism of the starting target astigmatism distribution. Subsequently, an interpolation of the target astigmatism values between the 0.5 dpt base target isoastigmatism line and the periphery of the spectacle lens is performed taking the maximum temporal astigmatism multiplied by the factor k into consideration. The interpolation is performed for the peripheral target astigmatism according to the truncated cone method described in DE 10 2009 005 206 or DE 10 2009 005 214.

Figure 2:
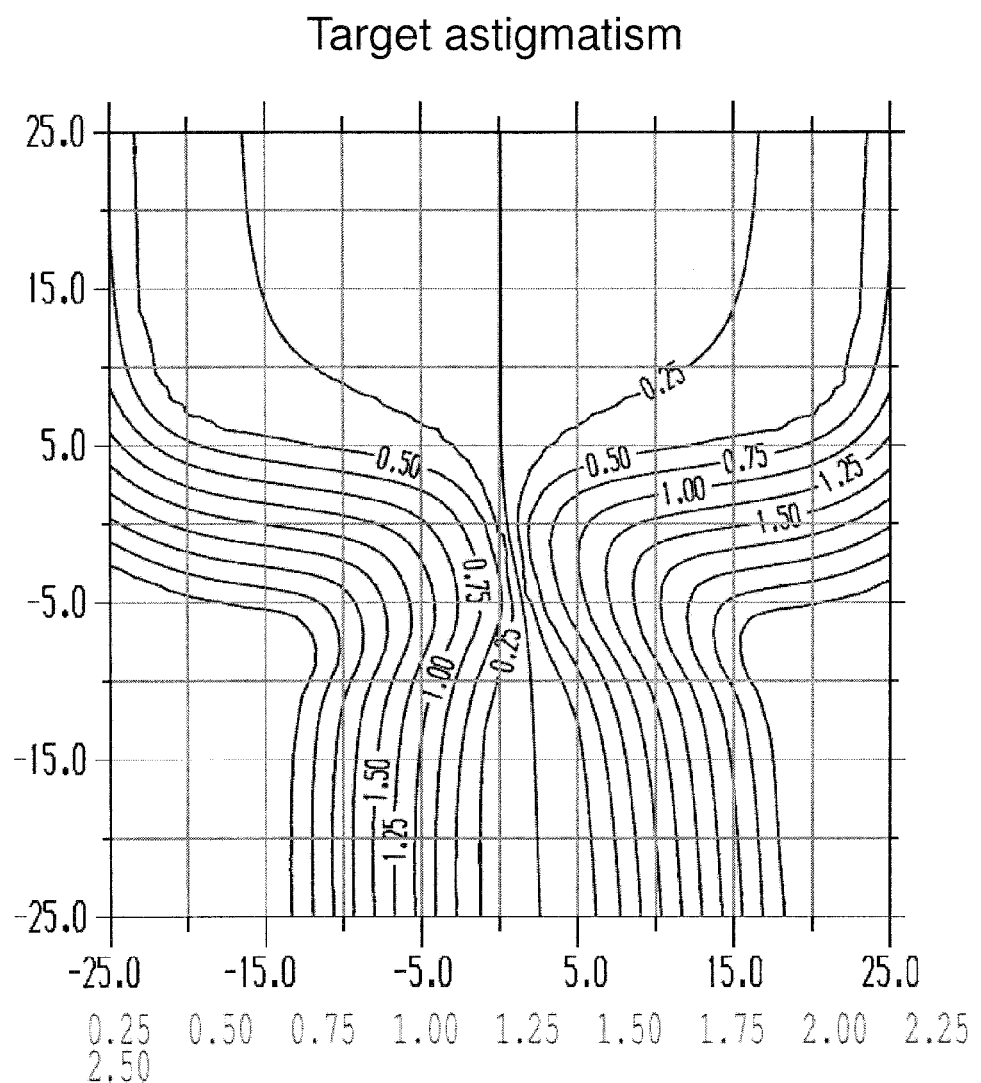
FIG. 2 target astigmatism distribution for an addition of 2.5 dpt with a scaling of the temporal astigmatism.

In this example, the multiplication of the maximum temporal astigmatism by the factor k does not have any influence on the 0.5 dpt base target isoastigmatism line. The target astigmatism values between the main line and the 0.5 dpt base target isoastigmatism line thus remain unchanged. Between the temporal 0.5 dpt base target isoastigmatism line and the peak of the temporal astigmatism hill (i.e. the position of the maximum target astigmatism), however, an interpolation on the basis of the scaled maximum temporal astigmatism (in this case 2.6*0.58=1,508 dpt) is performed. FIG. 2 shows the target astigmatism distribution obtained after a multiplication of the maximum temporal astigmatism and a subsequent interpolation. The asymmetric target astigmatism distribution shown in FIG. 2 applies to a progressive spectacle lens having an addition of 2.5 dpt.

Figure 3:
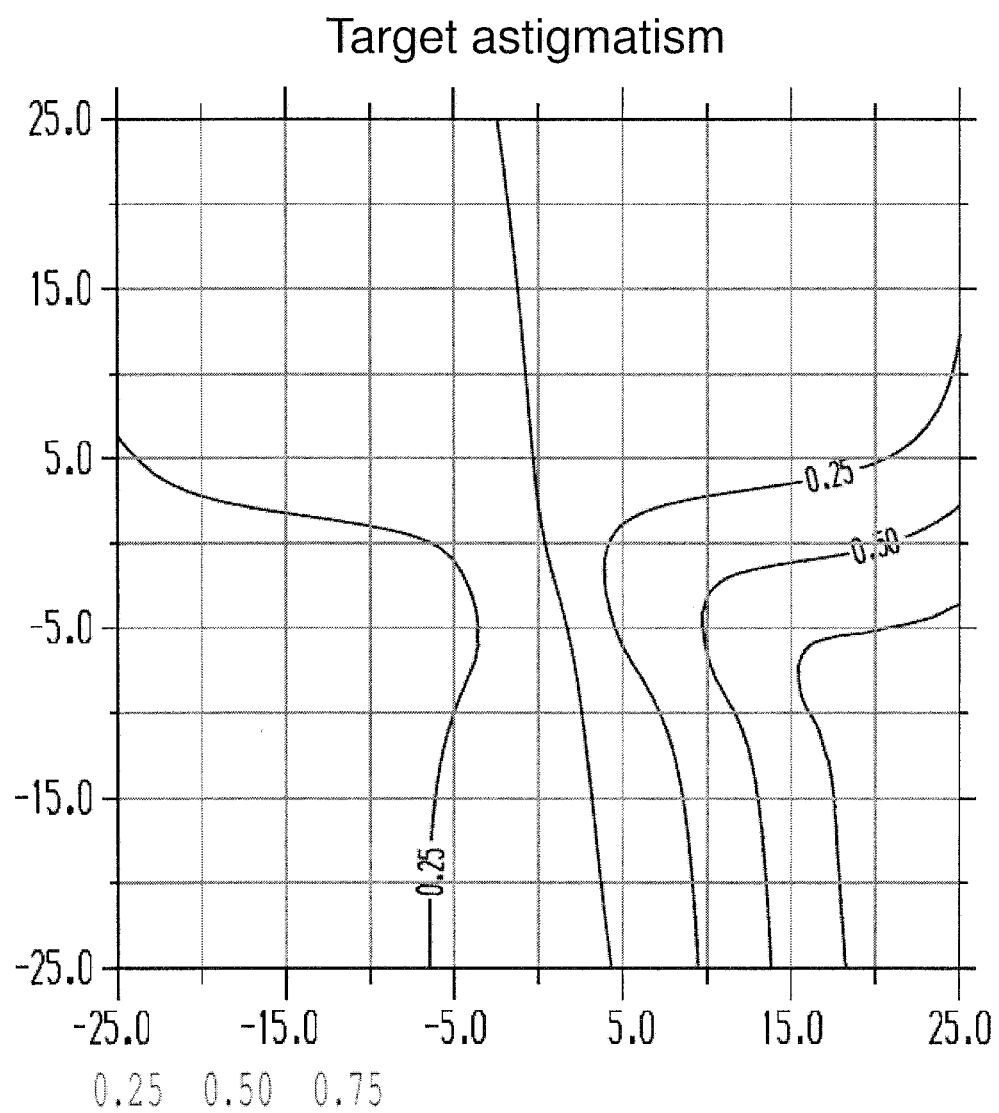
FIG. 3 the scaled target astigmatism distribution shown in FIG. 2, which is additionally scaled depending on the addition.

As described in DE 10 2008 015 189, the total astigmatism specification resulting from a multiplication of the maximum temporal target astigmatism with subsequent interpolation of the target astigmatism values could be scaled depending on the addition as a whole, in order to obtain target astigmatism specifications for a different addition. For example, the target astigmatism distribution shown in FIG. 2 can be scaled with the factor 0.3 as a whole to obtain a new addition of 0.75 from the original addition of 2.5 dpt. Thereby, a temporal maximum astigmatism of 1.508*0.3=0.45 results. The target astigmatism distribution additionally scaled depending on the addition is shown in FIG. 3.

Figure 4:
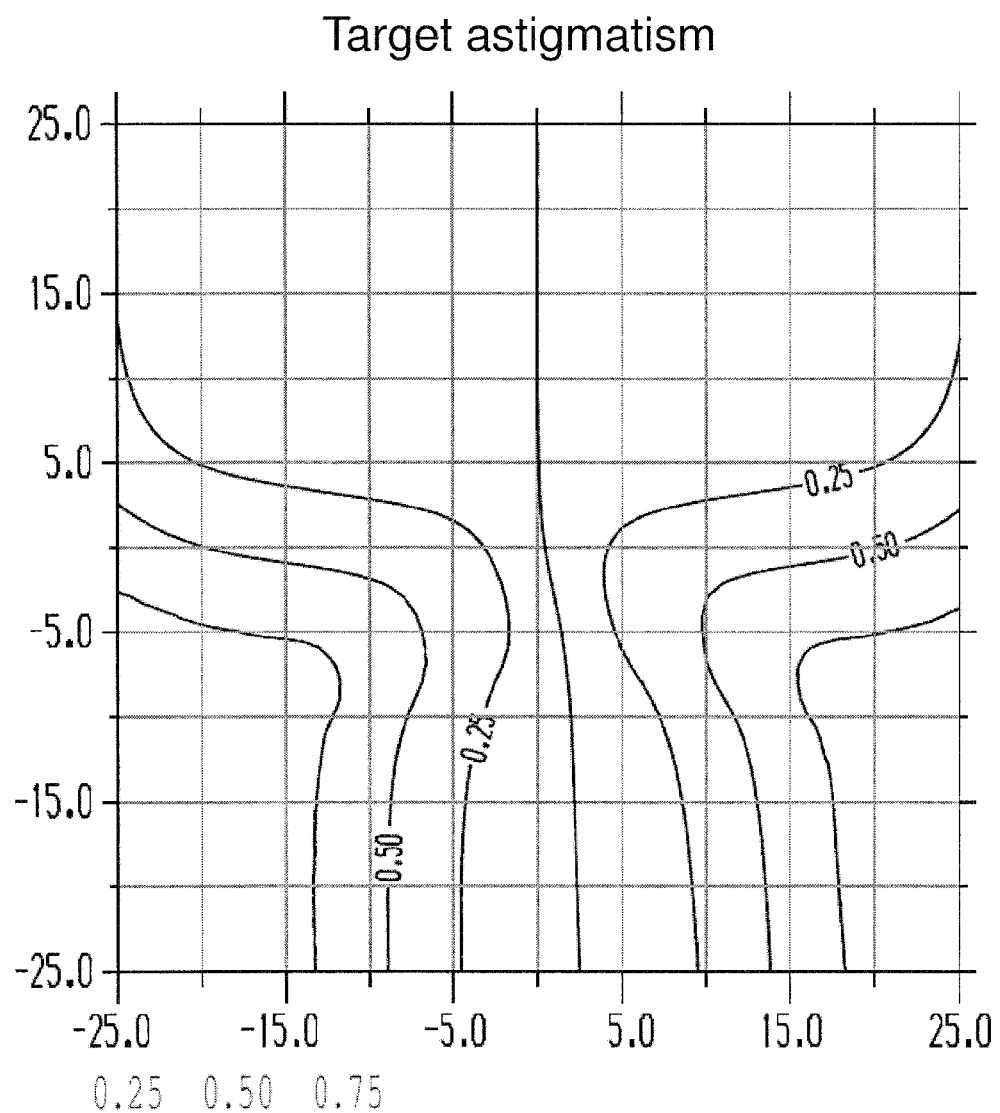
FIG. 4 the starting target astigmatism distribution scaled depending on the addition.

FIG. 4 shows a comparative example of a target astigmatism distribution obtained from the target astigmatism distribution shown in FIG. 1 by means of a (global) scaling depending on the addition (as described in DE 10 2008 015 189). The example shown in FIG. 4 corresponds to a rescaling of the starting target astigmatism distribution from the original addition of 2.5 dpt to a new addition of 0.75 dpt.

Figure 5:
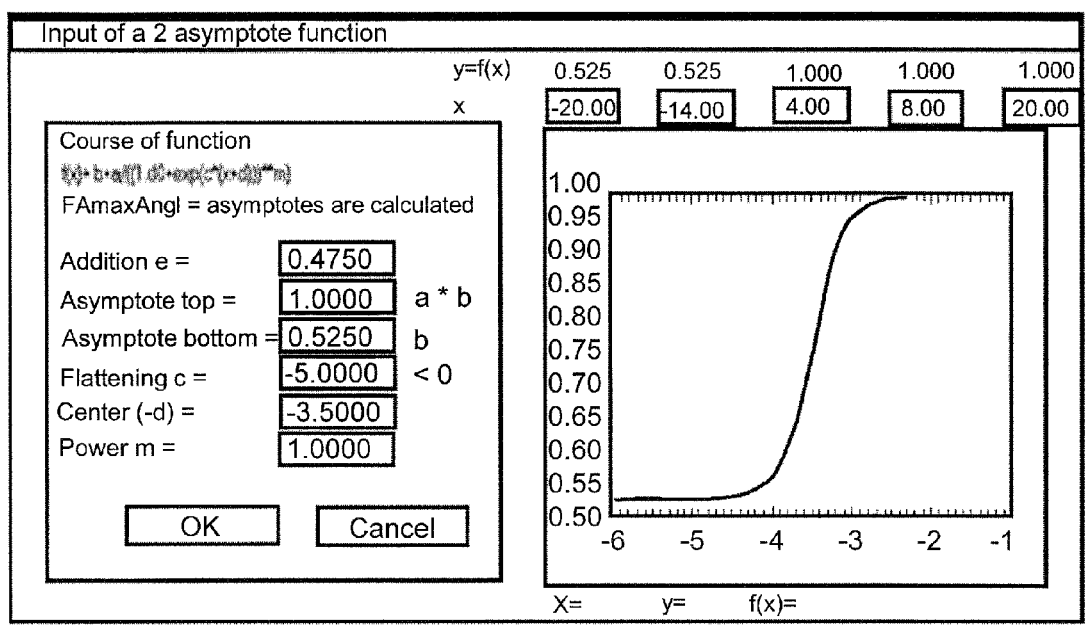
FIG. 5 a portion of a graphical user interface for setting the prefactor v.

FIG. 5 shows a portion of a graphical user interface, which makes it possible to set the prefactor v. As described above, the asymptotic prefactor v can be specified e.g. depending on the mean distance power by a double asymptote function (cf. equation 7) with the parameters a=0.475; b=0.525; c=−5.0; d=3.5 and m=1.

Figure 6A:
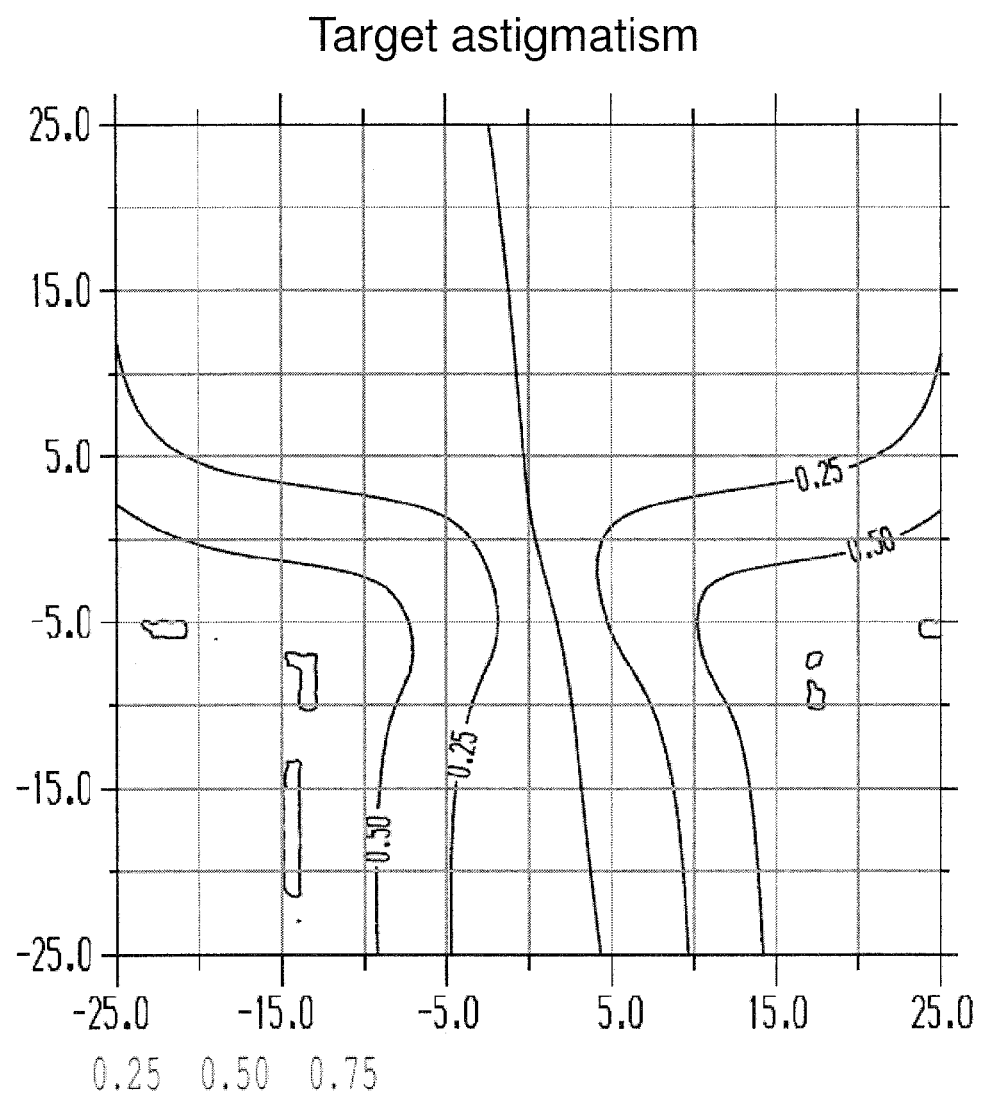
FIG. 6A an example of a starting target astigmatism distribution.

FIGS. 6A, B to 12A, B show the change of the target objectives in an exemplary transformation of the temporal target astigmatism distribution (FIGS. 6A and 6B) as well as the change of the results of the optimization of a progressive spectacle lens according to the respective target astigmatism objectives. The parameters of the prescription are as follows:
sphere (sph)=−8 dpt;
cylinder (cyl)=6 dpt;
axis 45°;
addition 0.75 dpt.

The tilt angle, which in the case of flat base curves approximately corresponds to the face form angle, is 5°.

According to the above-described formulae (7) to (14), a factor k with a value of 0.58 results.

Figs. X-A (X=6, 7, . . . 12) relate to a comparative example with a symmetric target astigmatism distribution ("starting target astigmatism distribution"). Figs. X-B (X=6, 7, . . . , 12) relate to an embodiment according to an aspect of the invention ("manipulated target objectives") with a non-symmetric target astigmatism distribution.

Figure 6B:
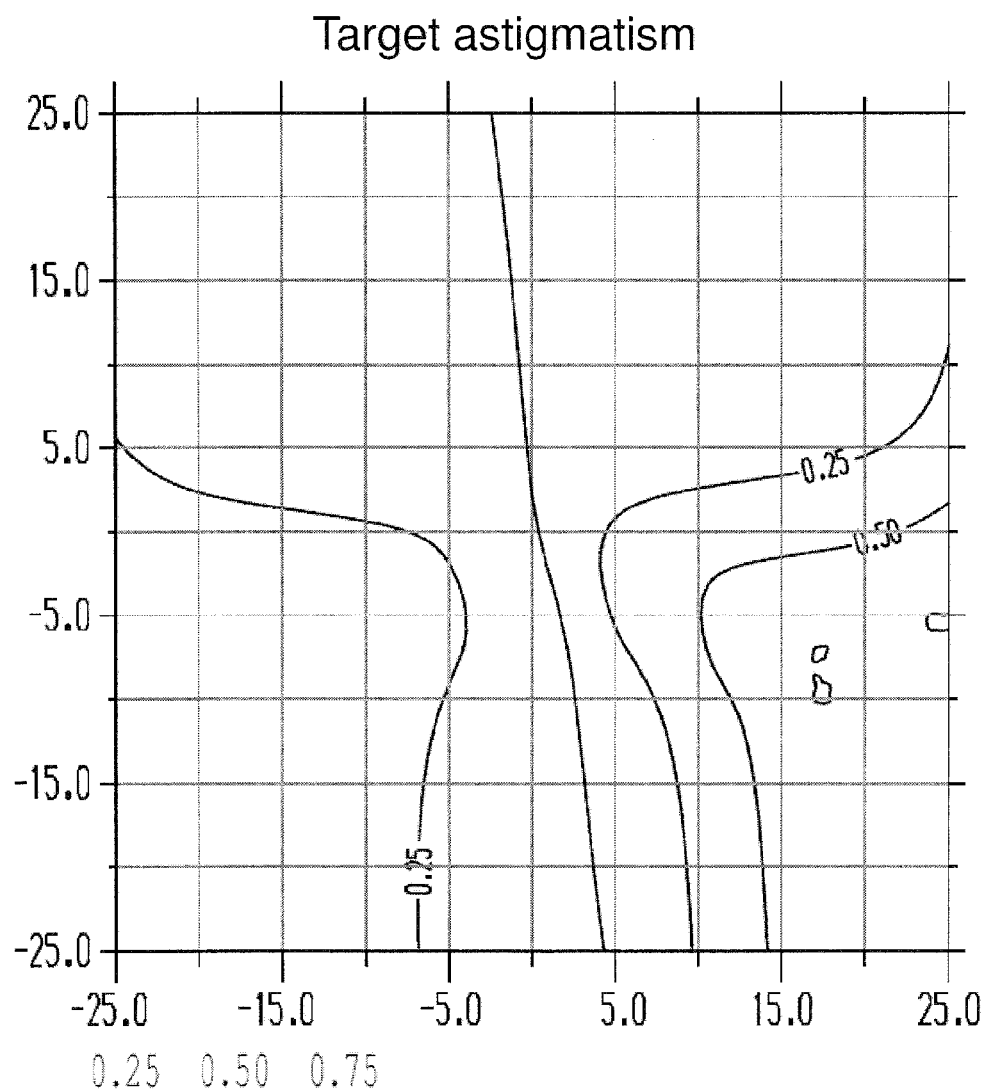
FIG. 6B an example of a modified/transformed target astigmatism distribution calculated from the starting target astigmatism distribution shown in FIG. 6A.

The target astigmatism distribution shown in FIG. 6B is obtained from the symmetric target astigmatism distribution shown in FIG. 6A by a multiplication of the temporal target astigmatism by the factor k=0.58 and a subsequent interpolation of the target astigmatism values. The interpolation is performed according to the truncated cone model disclosed in DE 10 2009 005 206 or DE 10 2009 005 214 for the peripheral astigmatism. The nasal target astigmatism is not affected by this modification. Consequently, the maximum temporal target astigmatism is lower than the maximum nasal target astigmatism by the factor 0.58.

FIGS. 7A to 10A show the surface properties of the progressive surface of a spectacle lens optimized according to the symmetric target astigmatism objectives shown in FIG. 6A. FIGS. 7B to 10B show the surface properties of the progressive surface of a spectacle lens optimized according to the asymmetric manipulated target objectives shown in FIG. 6B.

Figure 11A:
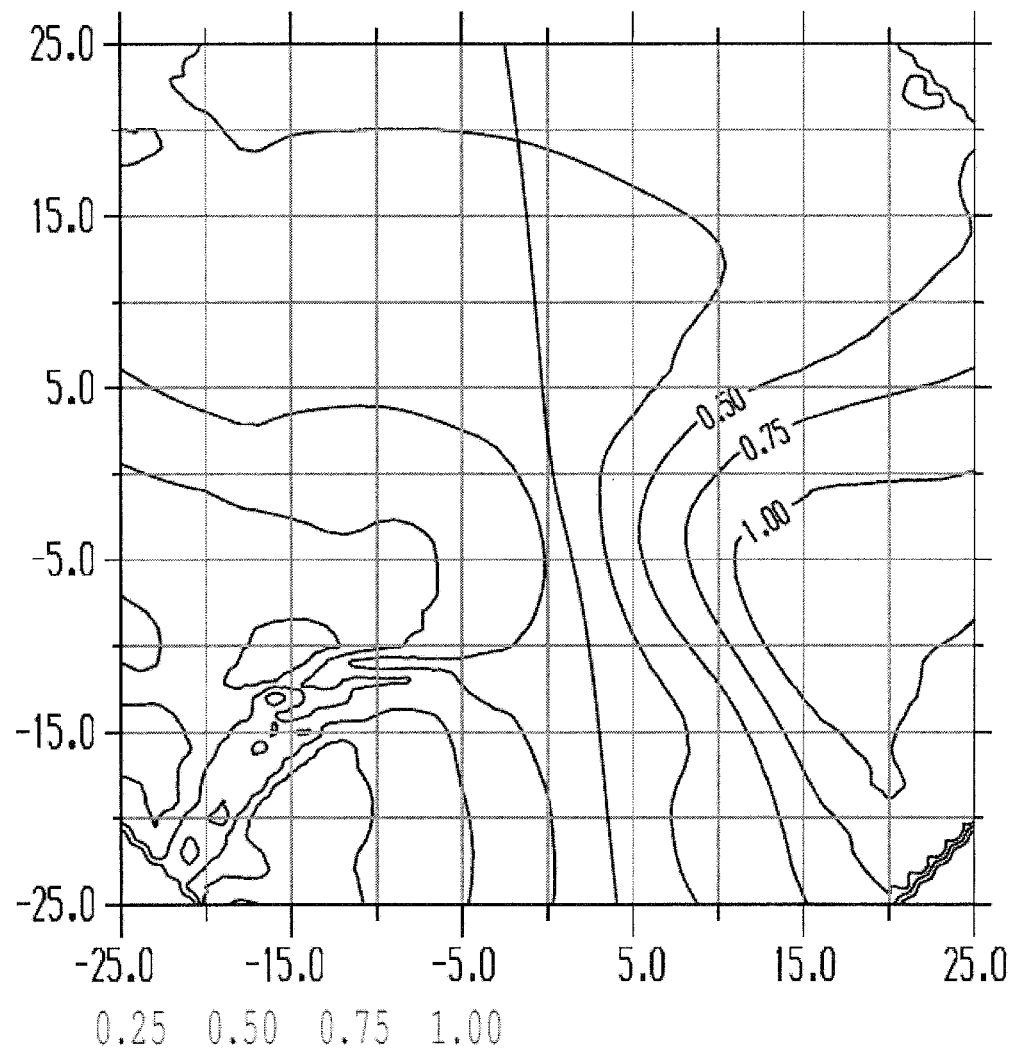
FIG. 11A the astigmatism in the wearing position of the progressive spectacle lens optimized on the basis of the starting target astigmatism distribution shown in FIG. 6A.

FIGS. 11A, B and 12A, B each show the astigmatism (FIGS. 11A, B) and the refractive power (FIGS. 12A, B) in the wearing position of the respective progressive spectacle lens. The following table 1 lists the target objectives and properties, shown in FIGS. 6A, B to 12A, B, of a progressive surface optimized on the basis of the respective target objectives.

TABLE 1

Figure 7A:
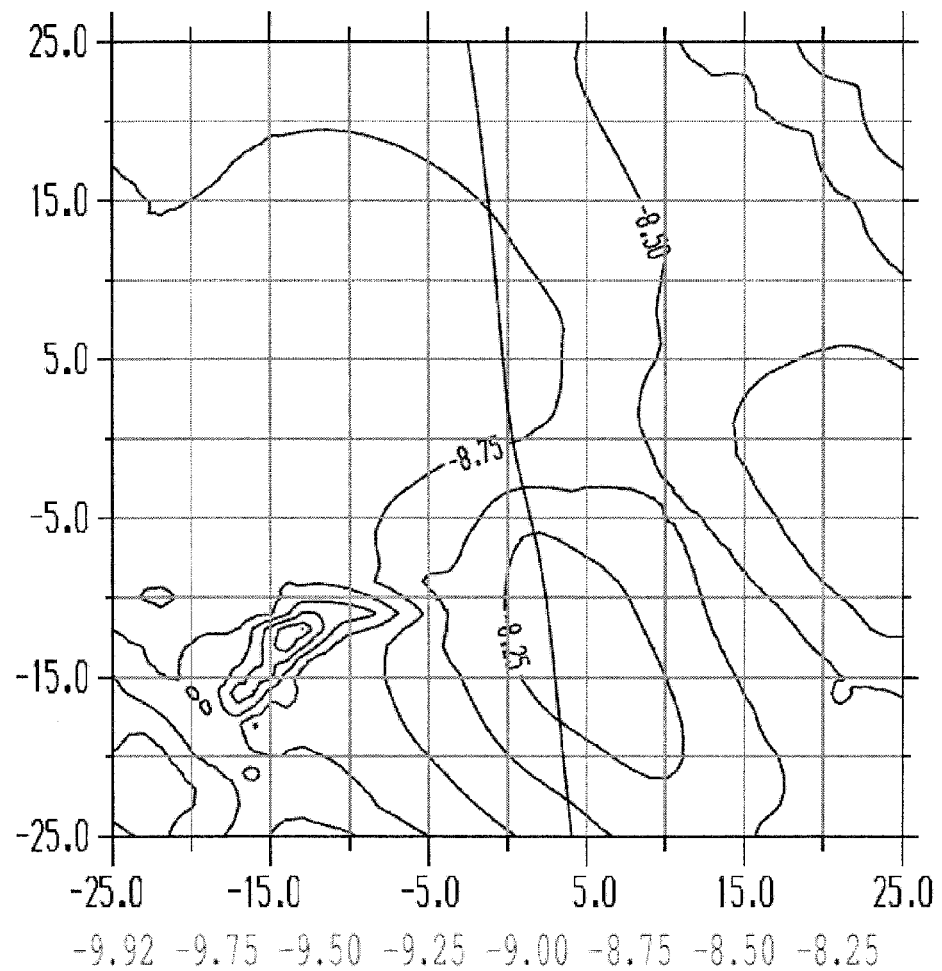
FIG. 7A the surface power of the progressive surface of a progressive spectacle lens optimized on the basis of the starting target astigmatism distribution shown in FIG. 6A.
Figure 7B:
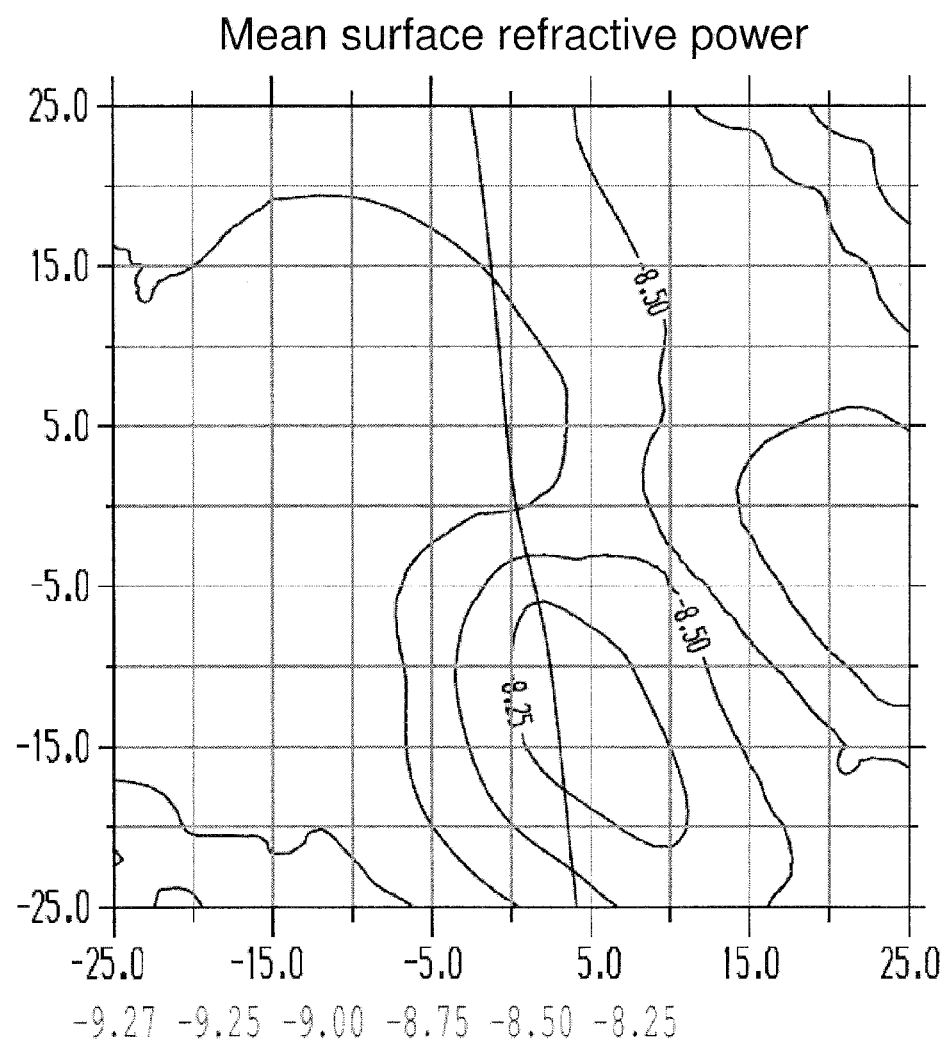
FIG. 7B the surface power of the progressive surface of a progressive spectacle lens optimized on the basis of the transformed target astigmatism distribution shown in FIG. 6B.
Figure 8A:
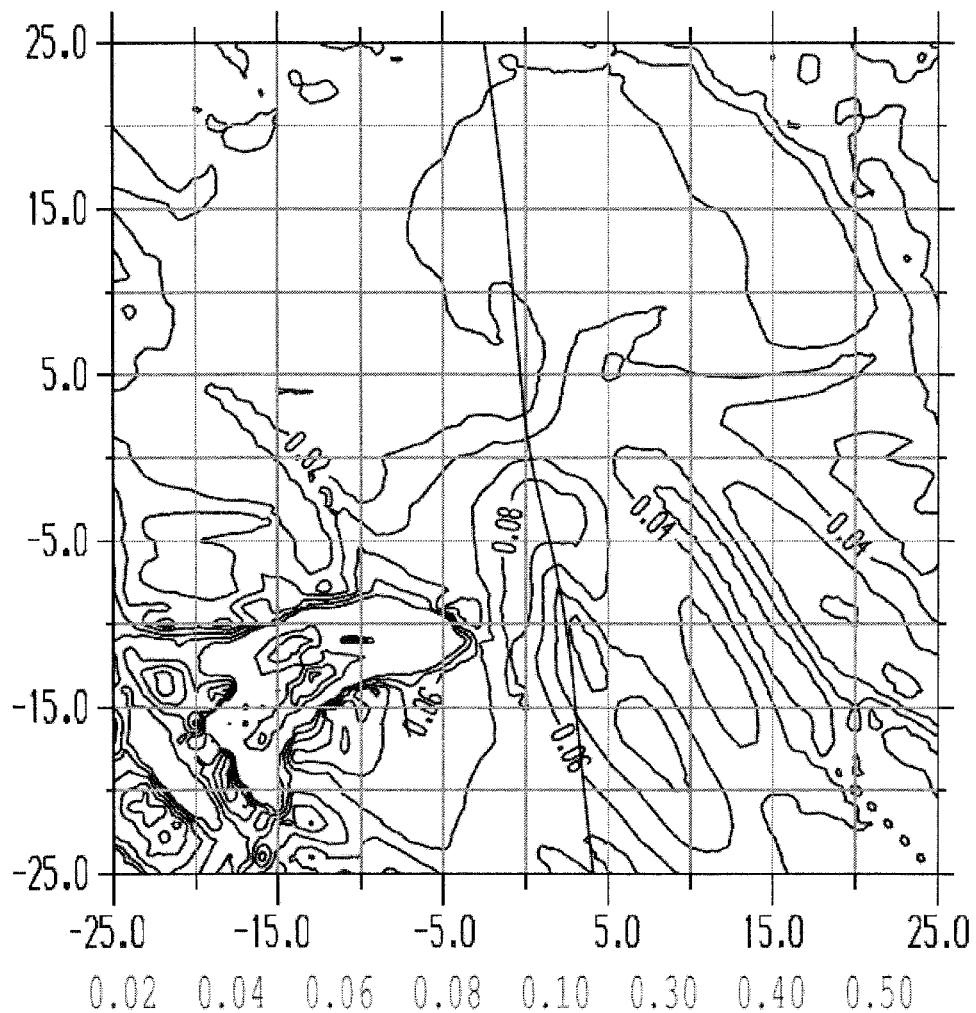
FIG. 8A the gradient of the surface power of the progressive surface of the progressive spectacle lens optimized on the basis of the starting target astigmatism distribution shown in FIG. 6A.
Figure 8B:
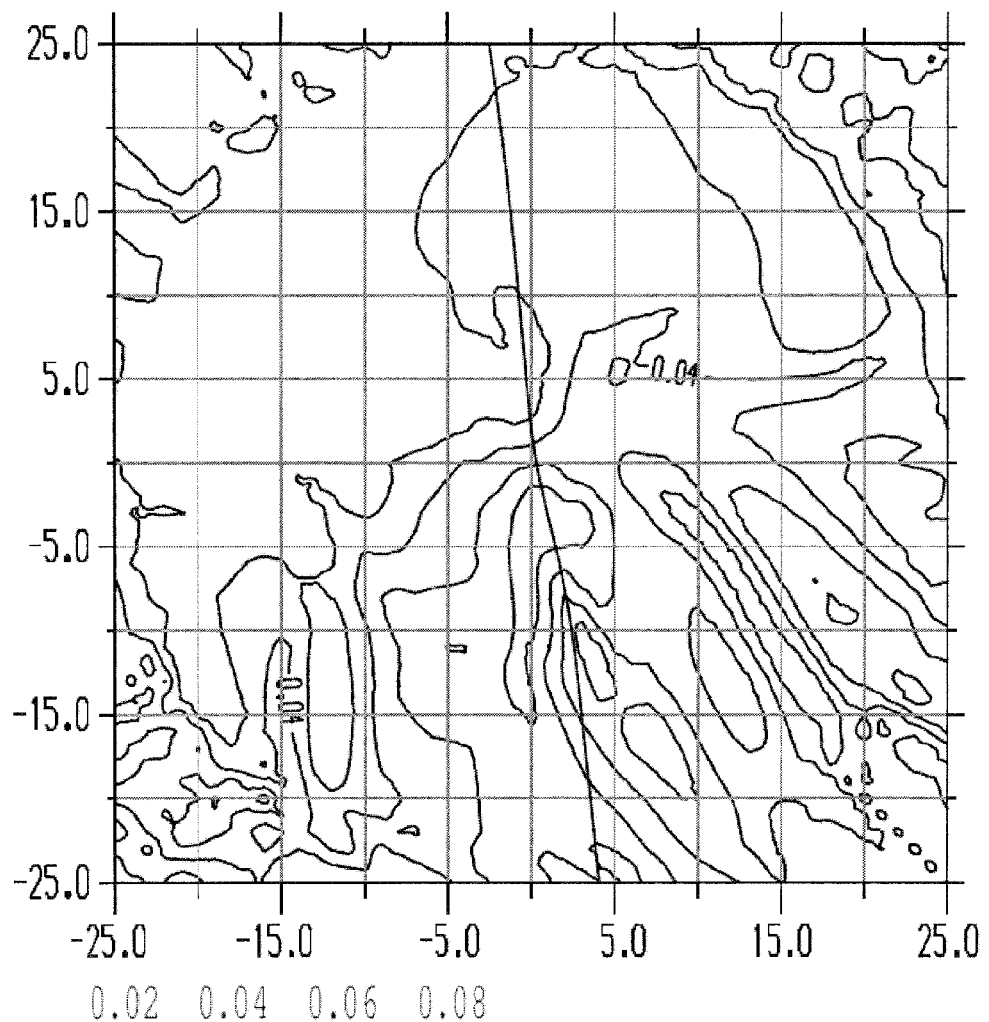
FIG. 8B the gradient of the surface power of the progressive surface of the progressive spectacle lens optimized on the basis of the transformed target astigmatism distribution shown in FIG. 6B.
Figure 9A:
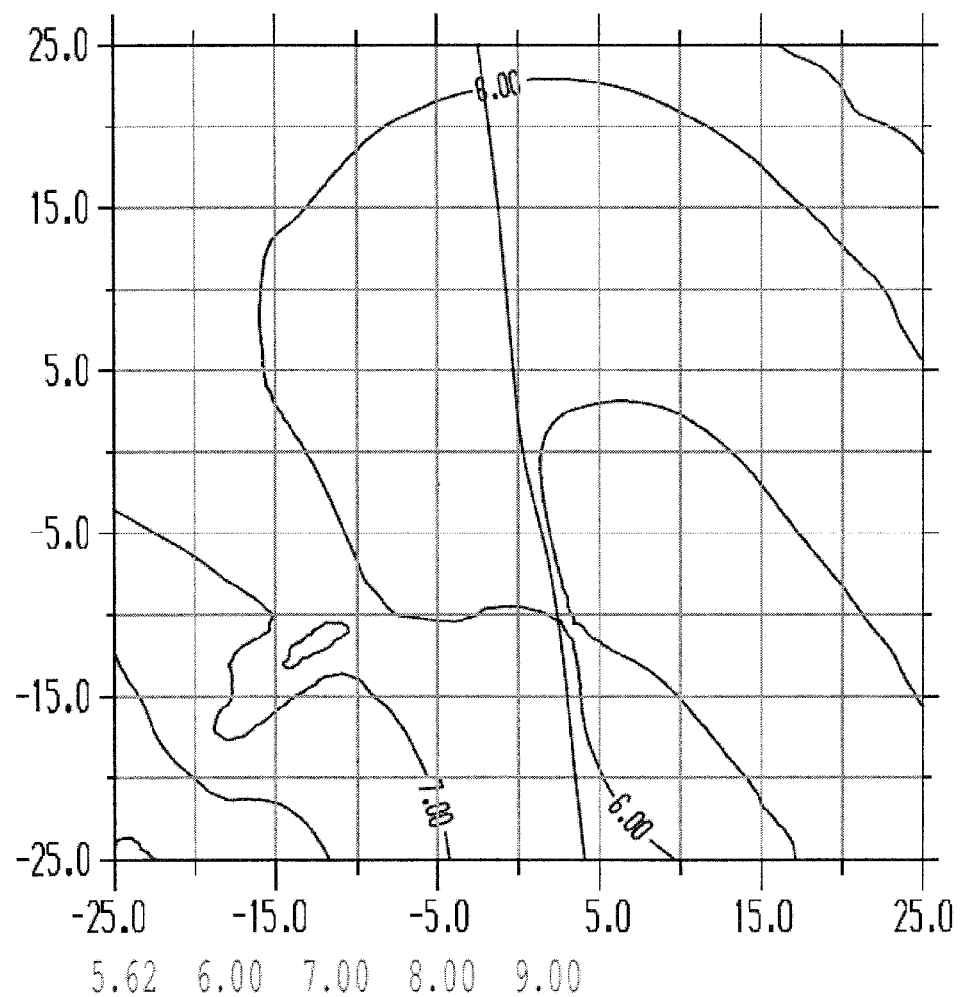
FIG. 9A the surface astigmatism of the progressive surface of the progressive spectacle lens optimized on the basis of the starting target astigmatism distribution shown in FIG. 6A.
Figure 9B:
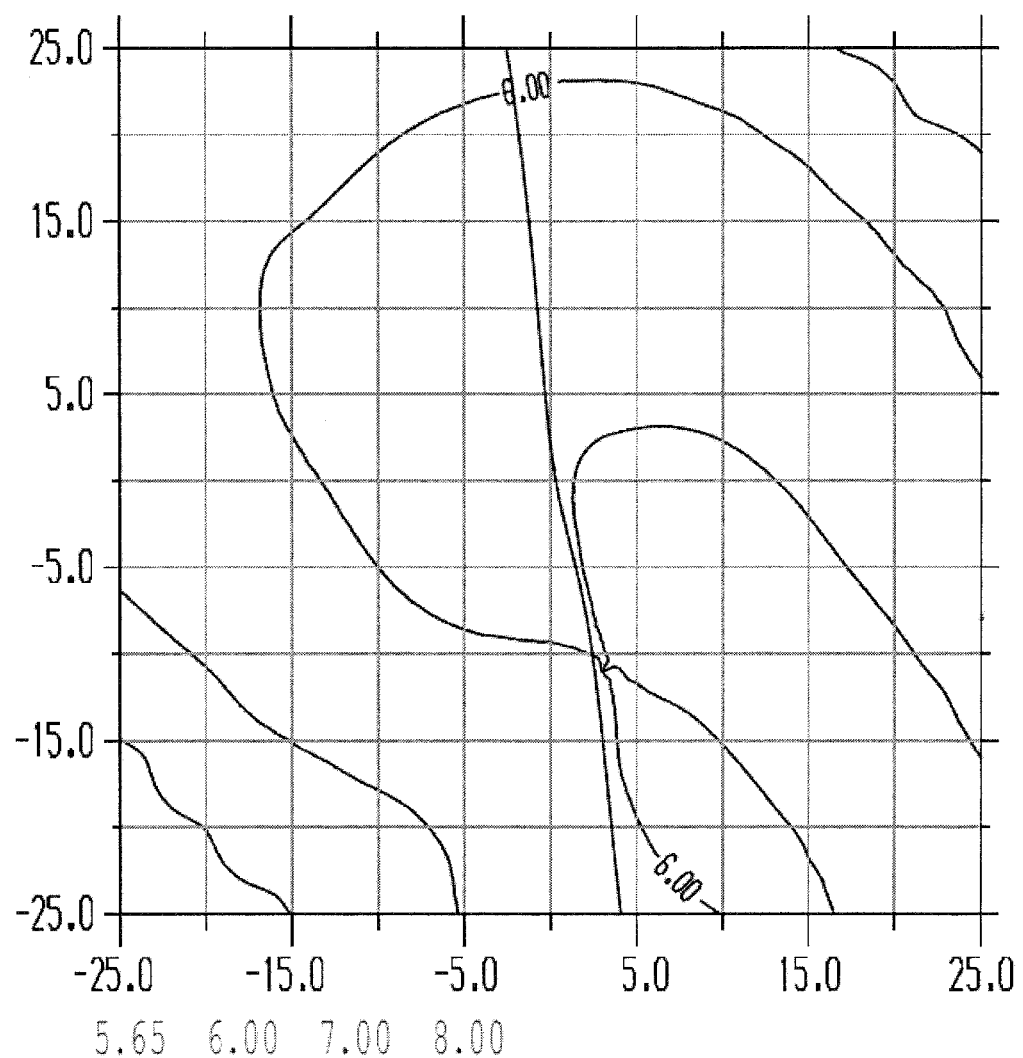
FIG. 9B the surface astigmatism of the progressive surface of the progressive spectacle lens optimized on the basis of the transformed target astigmatism distribution shown in FIG. 6B.
Figure 10A:
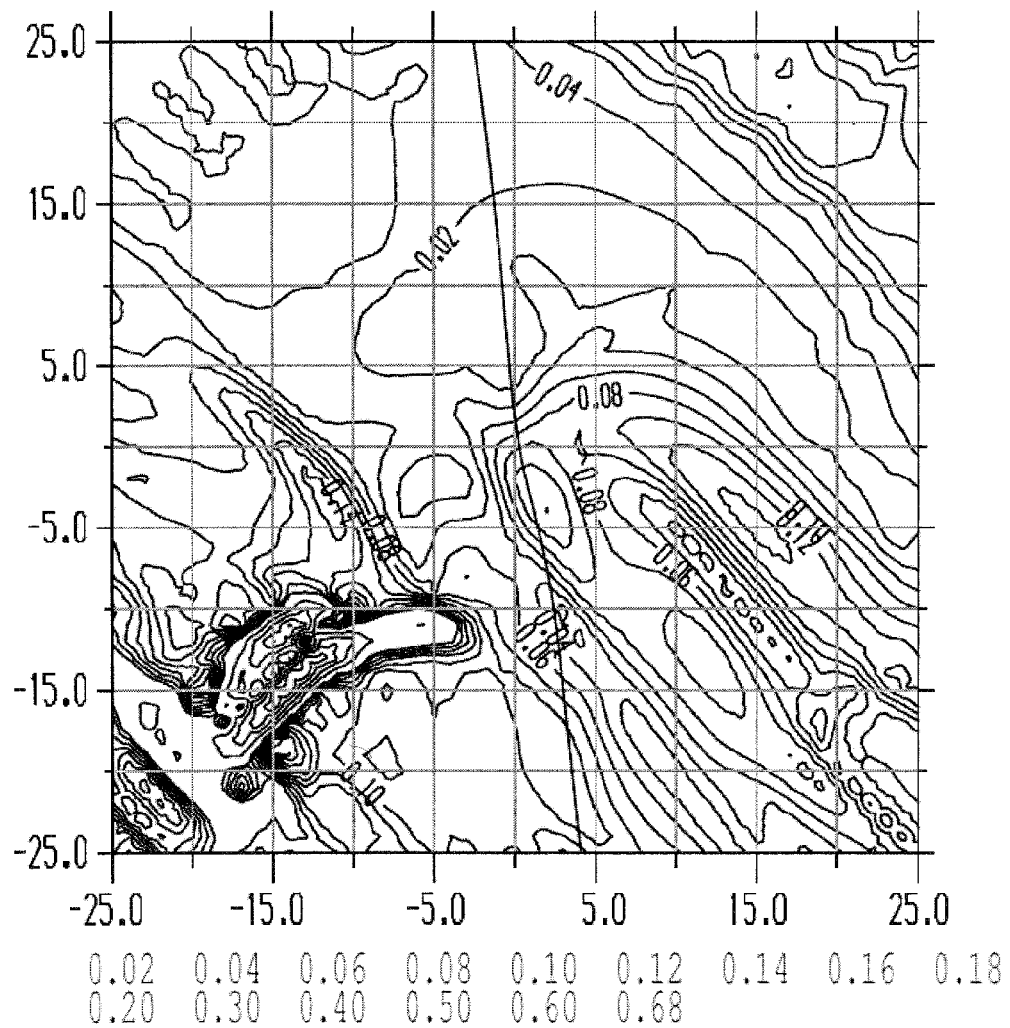
FIG. 10A the gradient of the surface astigmatism of the progressive surface of the progressive spectacle lens optimized on the basis of the starting target astigmatism distribution shown in FIG. 6A.
Figure 10B:
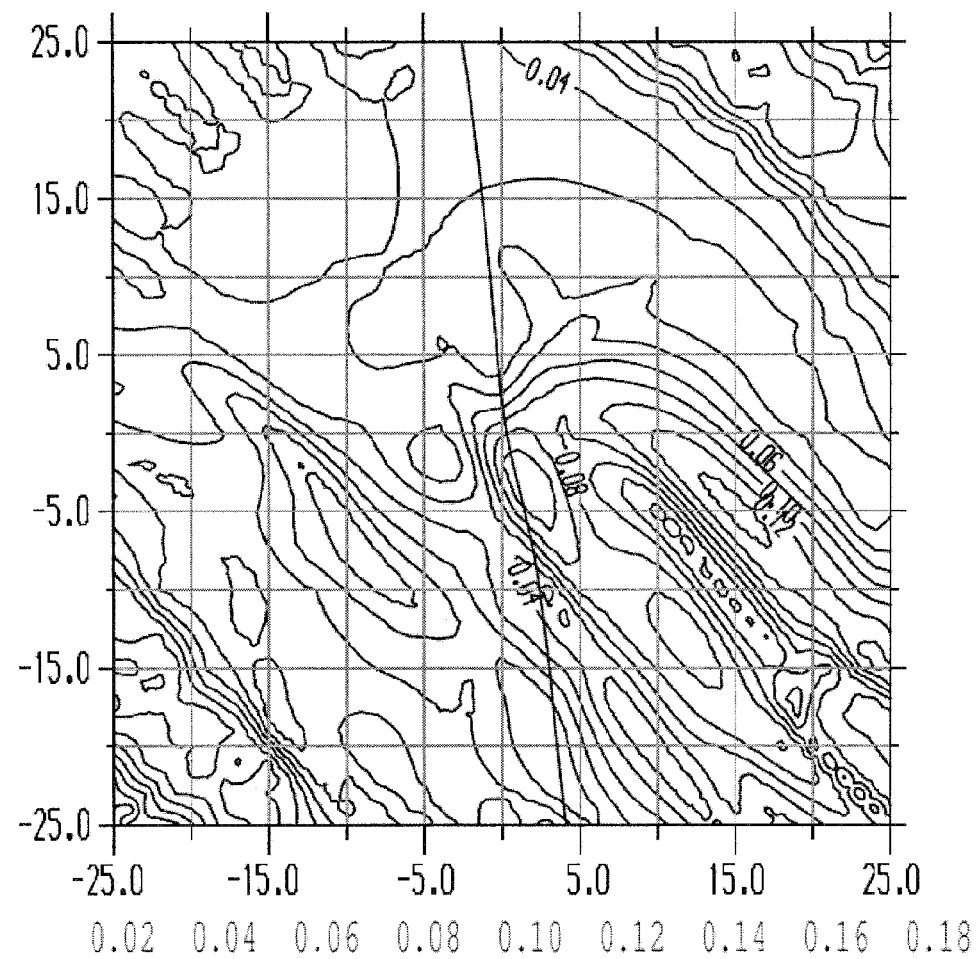
FIG. 10B the gradient of the surface astigmatism of the progressive surface of the progressive spectacle lens optimized on the basis of the transformed target astigmatism distribution shown in FIG. 6B.
Figure 11B:
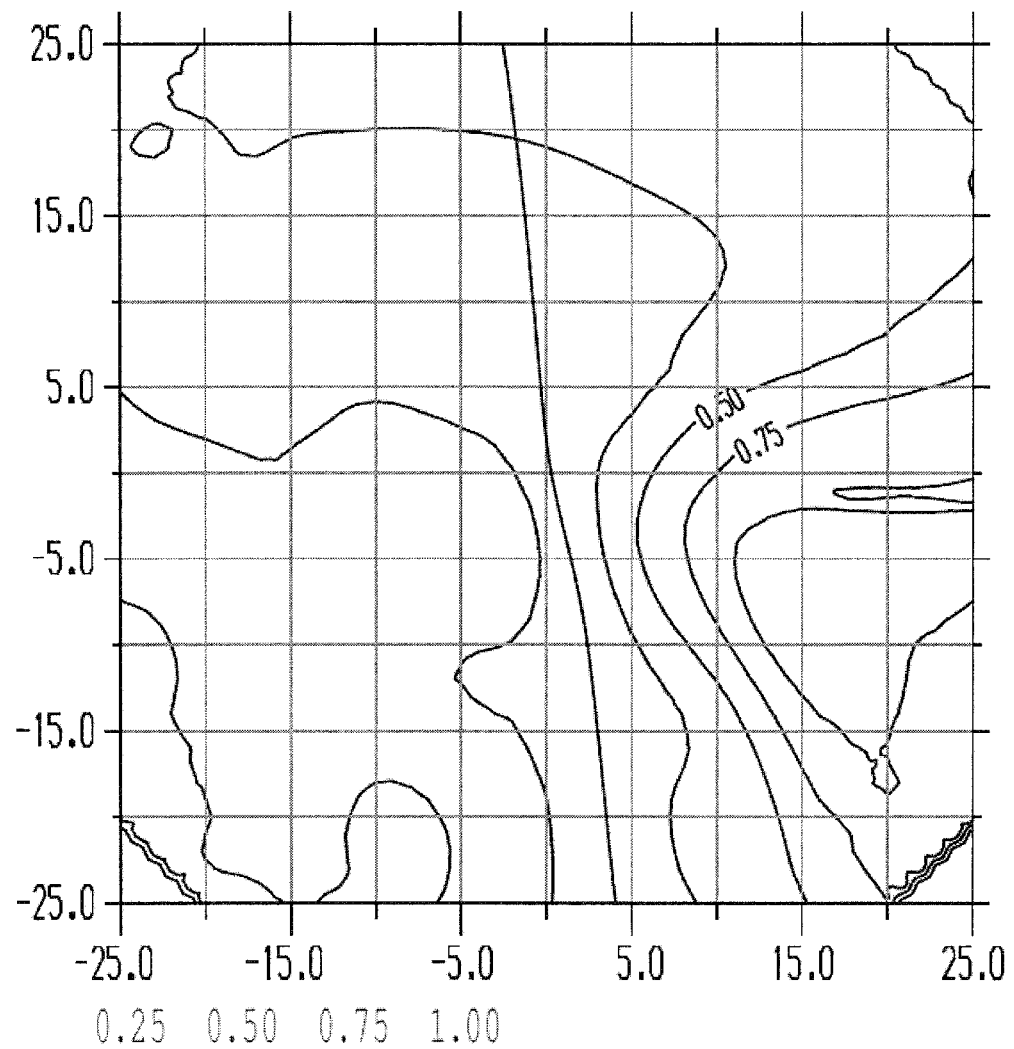
FIG. 11B the astigmatism in the wearing position of the progressive spectacle lens optimized on the basis of the transformed target astigmatism distribution shown in FIG. 6B.
Figure 12A:
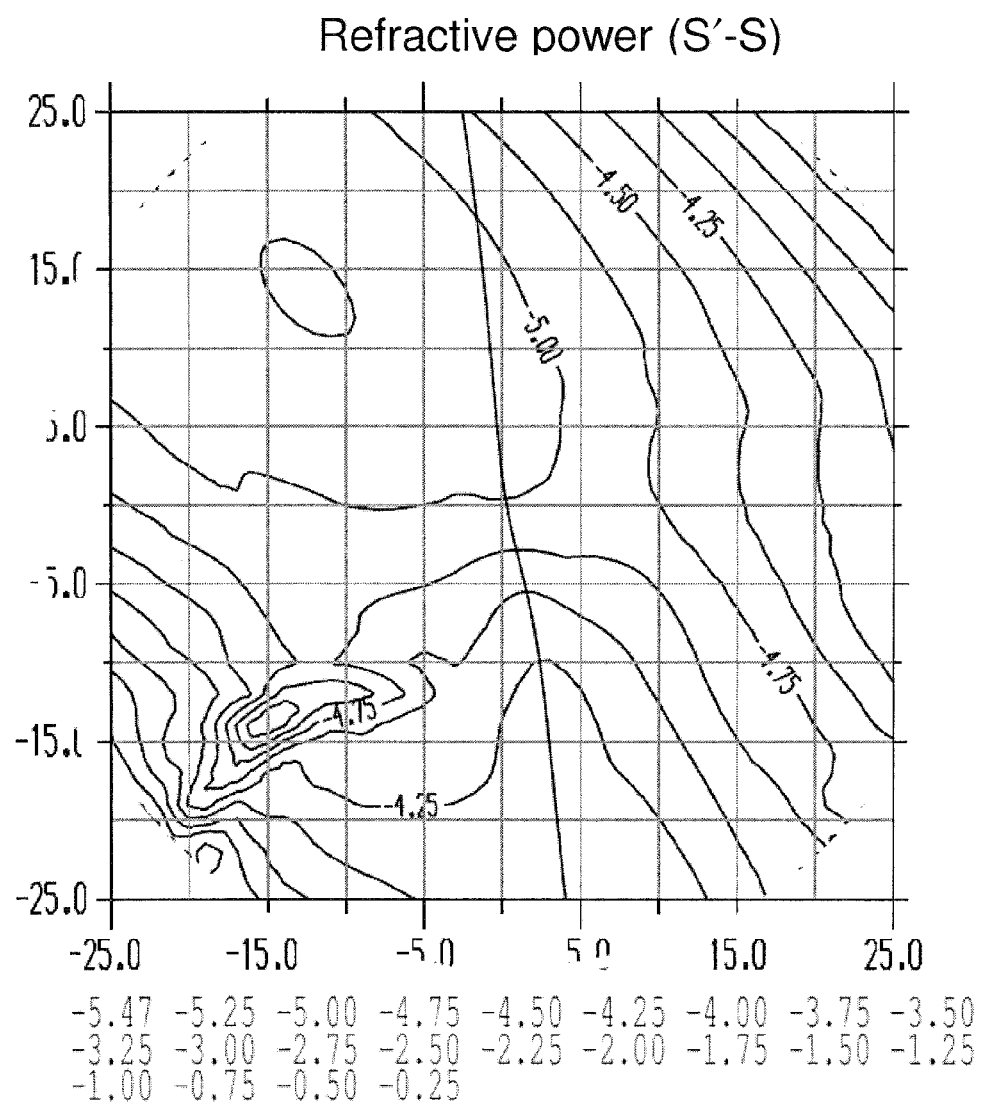
FIG. 12A the mean refractive power in the wearing position of the progressive spectacle lens optimized on the basis of the starting target astigmatism distribution shown in FIG. 6A.
Figure 12B:
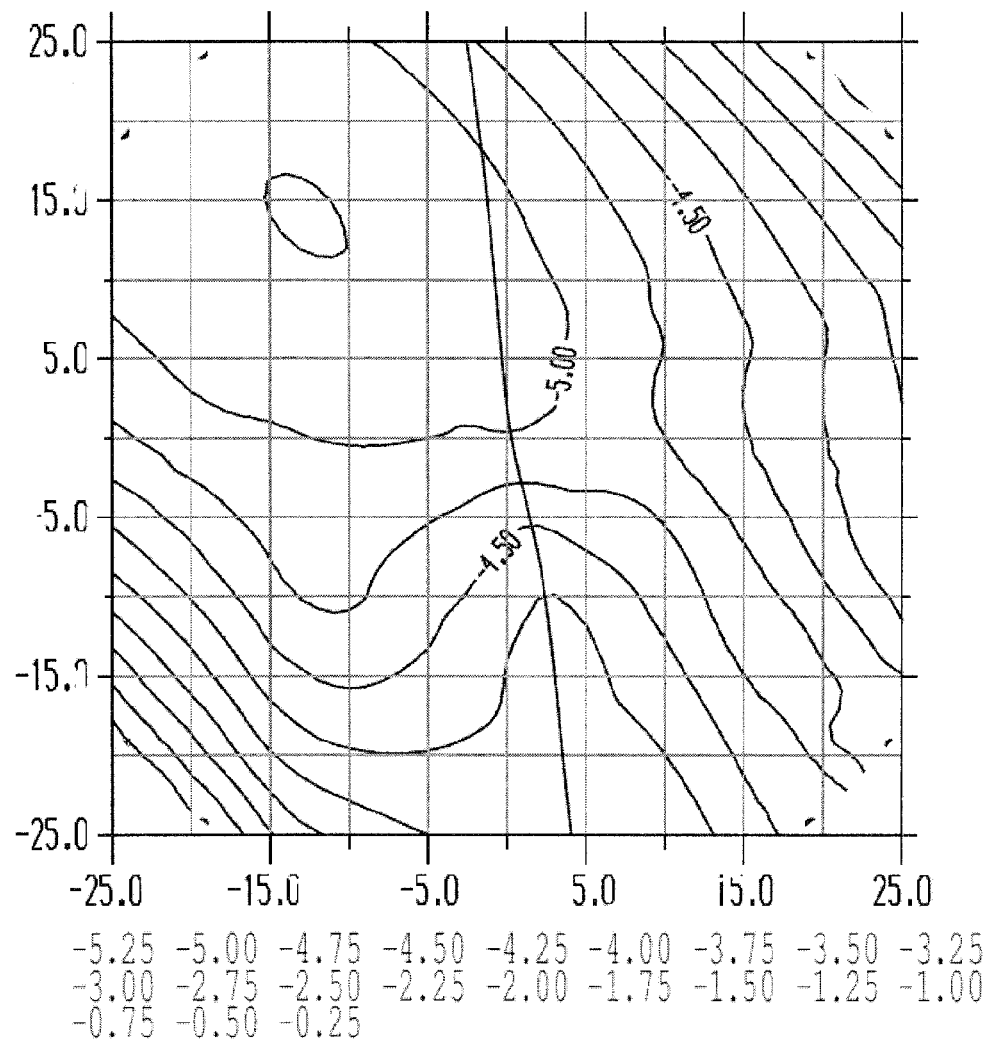
FIG. 12B the mean refractive power in the wearing position of the progressive spectacle lens optimized on the basis of the transformed target astigmatism distribution shown in FIG. 6B.

| Property shown | Symmetric target objectives | Manipulated target objectives |
|---|---|---|
| Target astigmatism [dpt] | FIG. 6A | FIG. 6B |
| Surface power of the progressive surface [dpt] | FIG. 7A | FIG. 7B |
| Surface power gradient of the progressive surface [dpt/mm] | FIG. 8A | FIG. 8B |
| Surface astigmatism of the progressive surface [dpt] | FIG. 9A | FIG. 9B |
| Surface astigmatism gradient of the progressive surface [dpt/mm] | FIG. 10A | FIG. 10B |
| Wearing position astigmatism [dpt] | FIG. 11A | FIG. 11B |
| Mean refractive power in wearing position [dpt] | FIG. 12A | FIG. 12B |

A comparison of FIGS. 6A and 6B clearly shows the asymmetry of the manipulated target astigmatism distribution shown in FIG. 6B. In FIG. 6B, the temporal target astigmatism is below 0.5 dpt.

The progressive surface of the spectacle lens optimized according to the manipulated target objectives shown in FIG. 6B has clearly less surface power modifications temporally (cf. also FIG. 8A and FIG. 8B). For example, in a comparison of the gradients of the surface power of the progressive surface shown in FIG. 8A and FIG. 8, it can be clearly seen that the progressive surface optimized according to the manipulated target astigmatism objectives temporally has substantially smaller gradients than the surface optimized according to the symmetric target astigmatism objectives. In this example, the gradients are smaller by a factor 5.

Moreover, a comparison of FIGS. 9A and 9B with FIGS. 10A and 10B shows that the progressive surface optimized according to the manipulated target astigmatism objectives temporally has clearly less modifications of the surface astigmatism and thus clearly smaller gradients of the surface astigmatism than the surface optimized according to the symmetric target astigmatism objectives. In this example, the gradients are smaller by a factor 4.5.

Also, the properties in the wearing position (astigmatism and refractive power in the wearing position) of the spectacle lens optimized according to manipulated target astigmatism objectives have clearly less gradients, wherein the central viewing zones do not differ substantially in size and usability. In the specific example, the gradients change from 0.45 dpt/mm to 0.05 dpt/mm. For the mean refractive power in the wearing position, a reduction from 0.55 dpt/mm (cf. FIG. 12A) to 0.15 dpt/mm (cf. FIG. 12B) will be obtained.

Figure 13A:
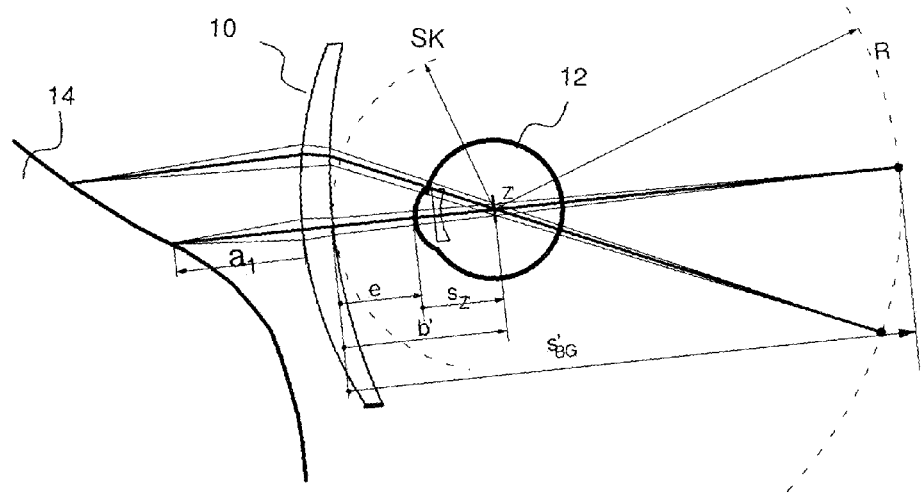
FIGS. 13A,B the image formation of objects at different object distances through a spectacle lens.
Figure 13B:
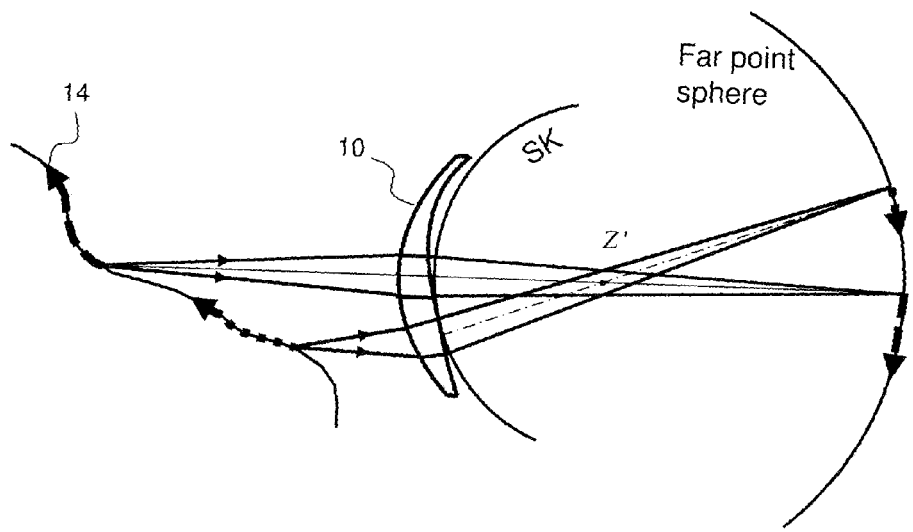

FIGS. 13A and 13B schematically show the image formation of objects at different object distances (object separations) through a spectacle lens 10. The spectacle lens 10 is disposed in a predetermined wearing position in front of the eyes 12 of the spectacles wearer. In FIGS. 13A and 13B:
a1=1/$A_1$ is the object distance (object separation);
e is the corneal vertex distance (CVD);
b' is the ocular center of rotation distance;
$s_{z'}$ is the distance corneal apex–ocular center of rotation
$s'_{BG}$ is the image separation/distance;
Z' is the ocular center of rotation;
R is the far point sphere; and
SK is the vertex sphere.

The calculation and optimization of the spectacle lens 10 is performed completely in the wearing position of the spectacle lens 12, i.e. taking the predetermined arrangement of the spectacle lens in front of the eyes 12 of the spectacles wearer (defined by the corneal vertex distance, forward inclination, etc.) and a predetermined object distance model into consideration. The object distance model can comprise the objectives for an object surface 14, which specify different object distances or object zones for foveal vision. The object surface 14 is preferably defined by the objectives for the reciprocal object distance (the reciprocal object separation) $A_1(x,y)$ along the object-side main rays. The course of the reciprocal object distance $A_1(x=x_0, y)=A_1(u=0,y)$ along the main line of sight (i.e. with $x=x_0$ and $u=0$) represents the object distance function. The object distance function $A_1(x=x_0,y)=A_1(u=0,y)$ determines the width of the viewing zones in the surrounding of the main line of sight (Minkwitz theorem). A point on the object surface is imaged to the far point sphere by the spectacle lens, as is schematically shown in FIGS. 13A and 13B. In the example shown in FIGS. 13A and 13B, the eye-side surface of the spectacle lens 10 is the progressive surface to be optimized.

Figure 14A:
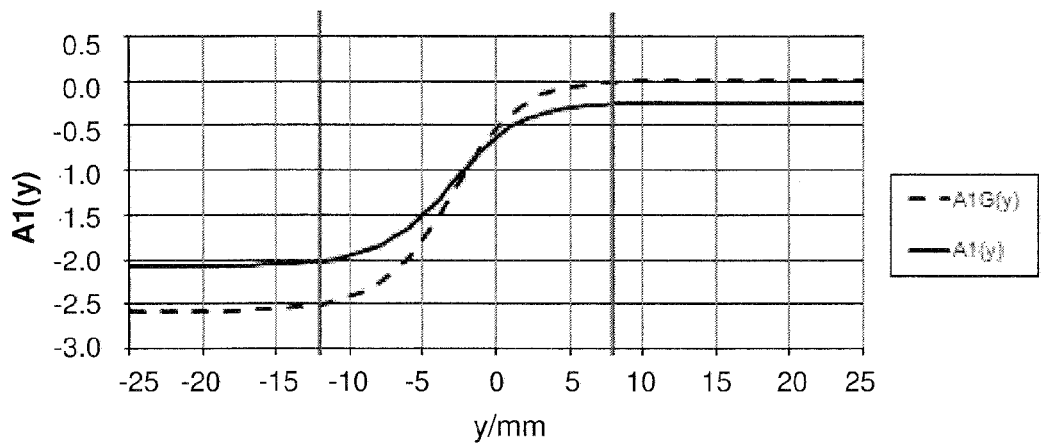
FIGS. 14A,B the reciprocal object distance (in dpt) along the main line of sight according to an example of the invention.
Figure 14B:
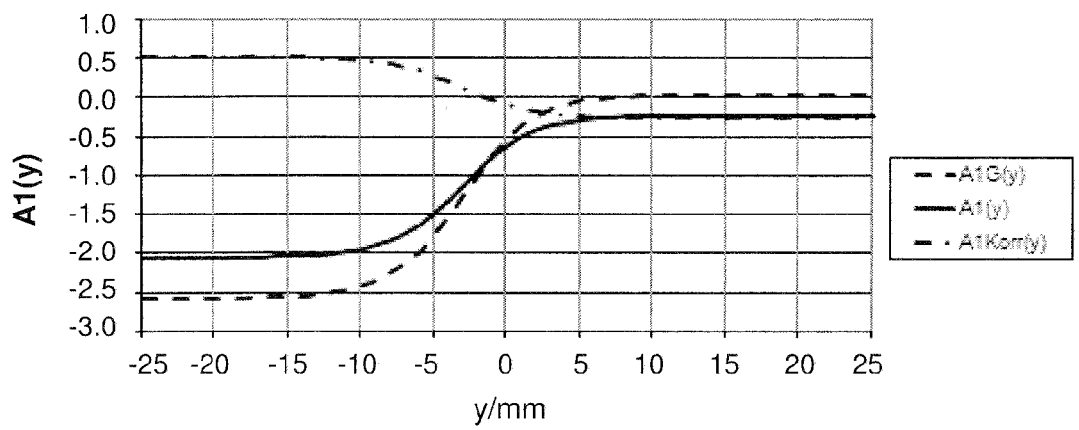

According to a first example, the object distance function $A_1(y)$ is represented as the sum of two double asymptote functions. FIGS. 14A and 14B show an exemplary starting object distance function $A_{1G}(y)$ (broken line) and a transformed object distance function $A_1(y)$ adjusted to the new object distance (solid line), which is obtained by means of overlaying the starting object distance function $A_1(y)$ with a correction function $A_{1corr}(y)$ (chain-dotted line).

The parameters of the starting object distance function (which is described by a double asymptote function) are $a_G=2.606$ dpt, $b_G=-2.588$ dpt, $c=-0.46$/mm, $d=2.2$ mm and $m=0.75$.

In this case, the distance reference point DF (design point distance) is at $y=+8$ mm ($y_{DF}=8$ mm) and the near reference point DN (design point near) is at $y=-12$ mm ($y_{DN}=-12$ mm). The object distance in the distance reference point is infinite and consequently $A_{1distance}=A_{1G}(y_{DF})=0.00$ dpt. The object distance in the near reference point is 40 cm and consequently $A_{1near}=A_{1G}(y_{DN})=-2.50$ dpt.

The object distances in the distance and near reference points for a specific spectacles wearer or for other designs and applications may be different from the above standard model though. For example, an object distance of −400 cm can be taken into consideration in the distance reference point DF, and an object distance of −50 cm in the near reference point. In this case, the modified specifications for the object distance in the distance and near reference points are $A_{1distance}=A_{1G}(y_{DF})=-0.25$ dpt and $A_{1near}=A_{1G}(y_{DN})=-2.00$ dpt, respectively.

By overlaying the starting object distance function $A_{1G}(y)$ with a correction function $A_{1corr}(y)$ with the same coefficients c, d and m as that of the starting object distance function and with the coefficients $b_{corr}=0.526$ and $a_{corr}=-0.782$, the adjusted course of the object distance function $A_1(y)$ shown in FIG. 14B results.

Figure 15A:
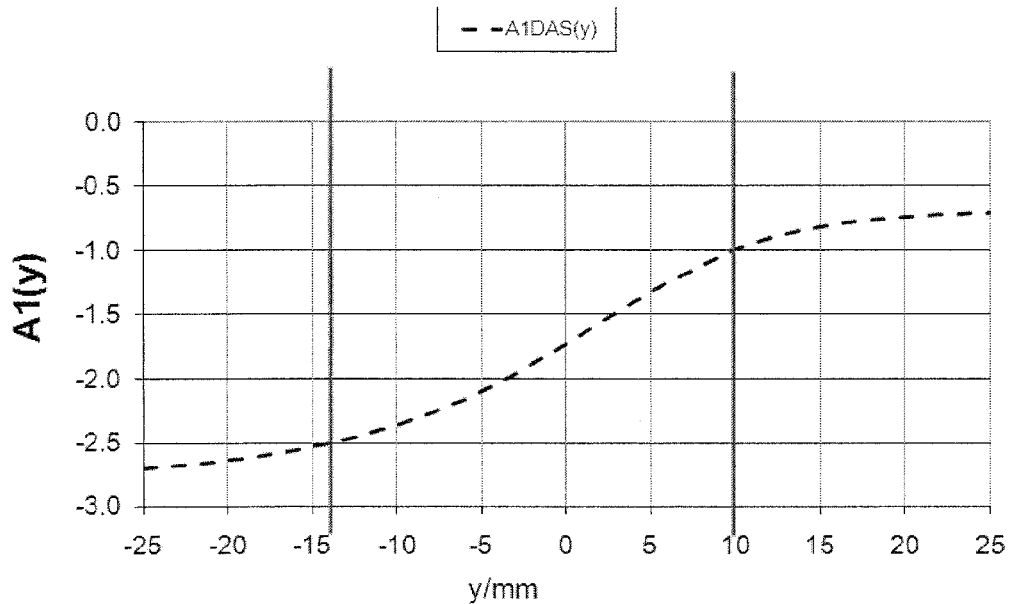
Figure 15B:
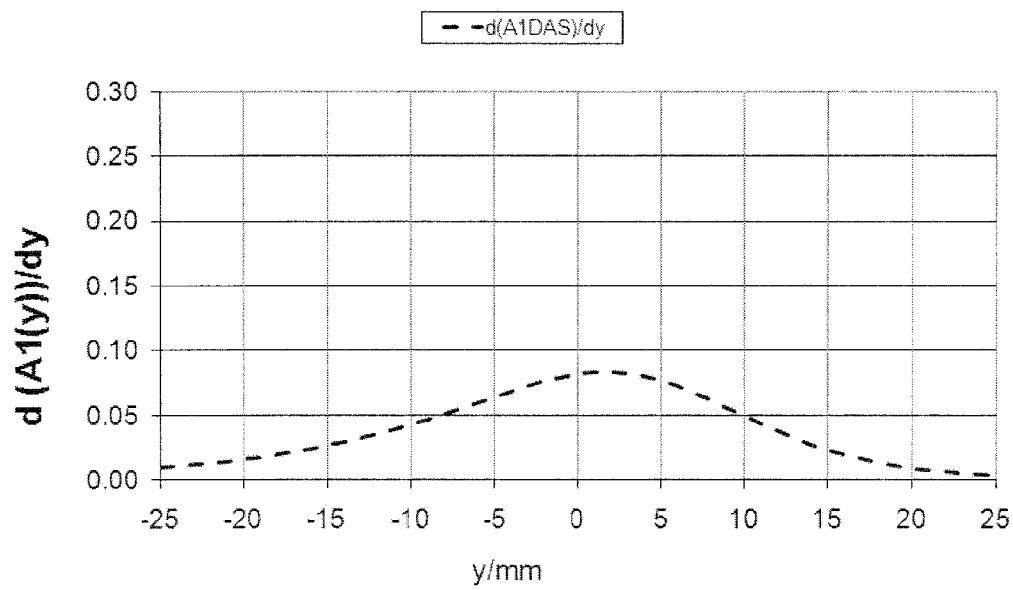

FIG. 15A shows a further exemplary starting object distance function $A_{1G}(y)$. FIG. 15B shows the slope of the starting object distance function (i.e. the derivative of the starting object distance function according to y). The starting object distance function is described by a double asymptote function with the coefficients $a_G=2.100$; $b_G=2.801$; $c=0.206$; $d=5.080$; $m=0.5$. The starting object distance function has a very smooth transition from the distance to the near portions. In this example, the reciprocal object distance $A_{1Gdistance}$ in the distance reference point DF (at $y=10$ mm) is equal to −1.00 dpt ($A_{1Gdistance}=-1.00$ dpt), and the reciprocal object distance $A_{1Gnear}$ in the near reference point DN (at $y=-14$ mm) is equal to −2.5 dpt ($A_{1Gnear}=-2.5$ dpt). Thus, the starting object distance function describes a tube design for a near-vision lens.

Figure 15C:
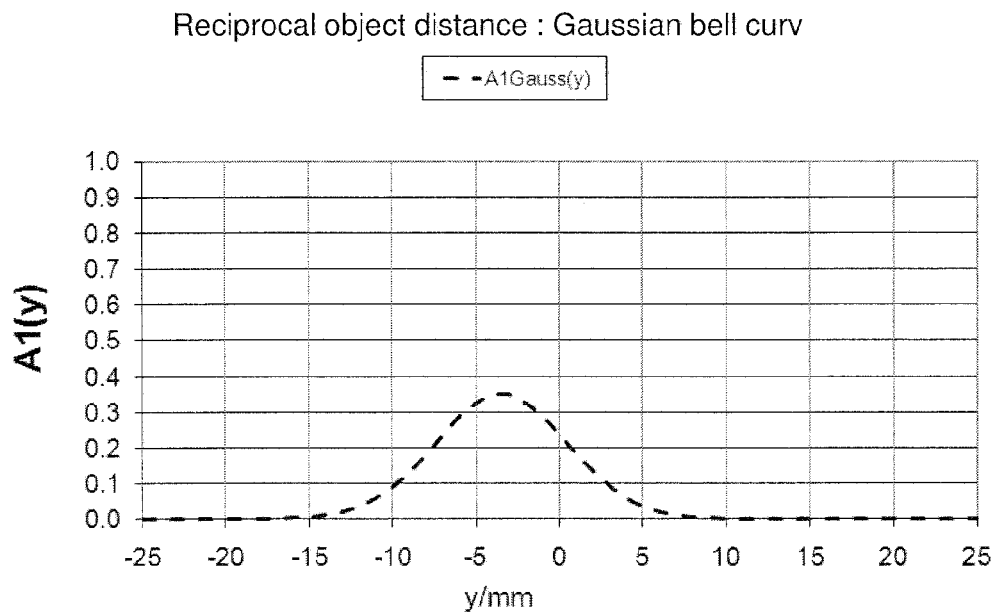
Figure 15D:
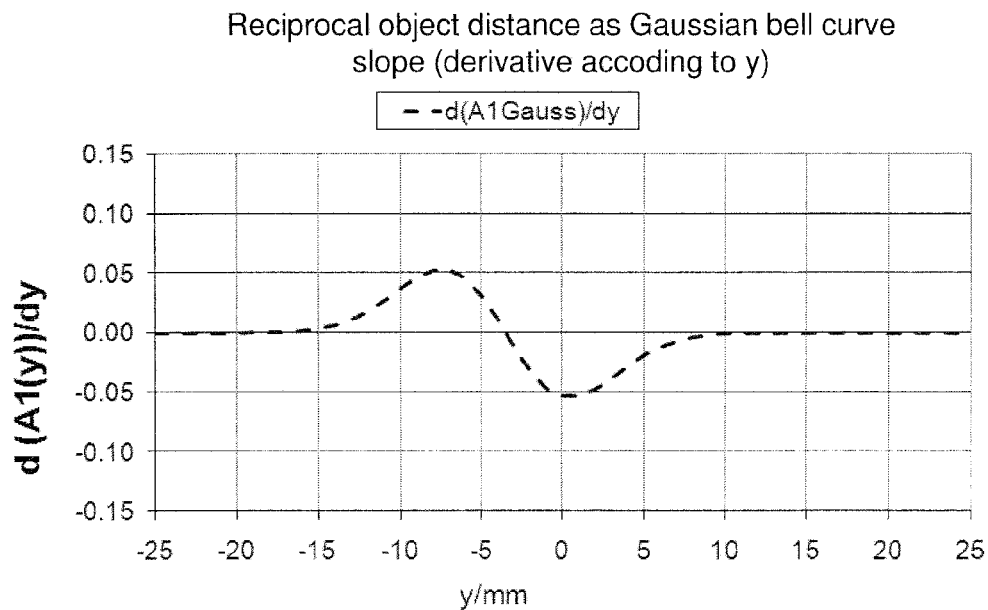

FIG. 15C shows an exemplary Gaussian function $A_{1G}(y)$ (i.e. the correcting reciprocal object distance along the main line of sight), which can be used for modifying the design characteristic, for example. The Gaussian function shown in FIG. 15C is described by a Gaussian bell curve $$g(y) = g_a + g_b e^{-\frac{y-y_0}{\sigma}}$$

with the coefficients $g_a=0.00$; $g_b=0.35$; $\sigma=5.56$ and $y_0=-3.47$. FIG. 15D shows the slope (first derivative according to y) of the Gaussian bell curve shown in FIG. 15C.

Figure 15E:
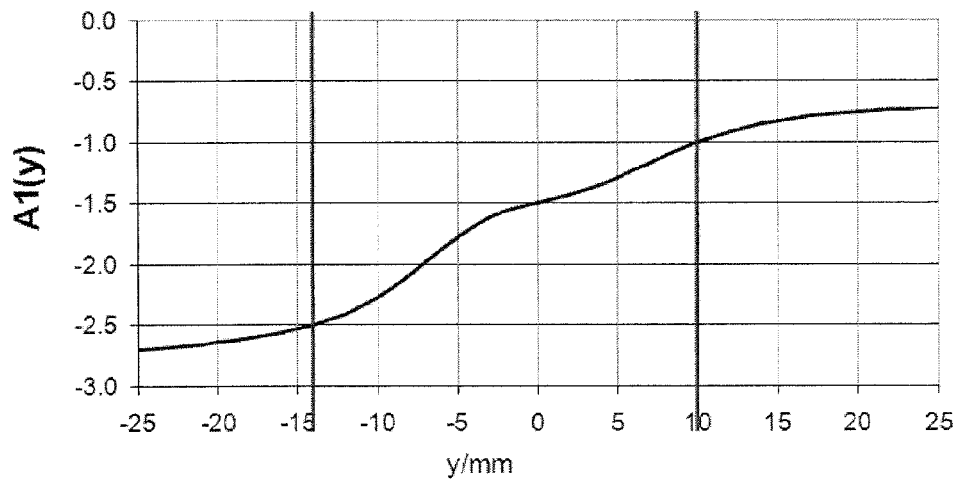
Figure 15F:
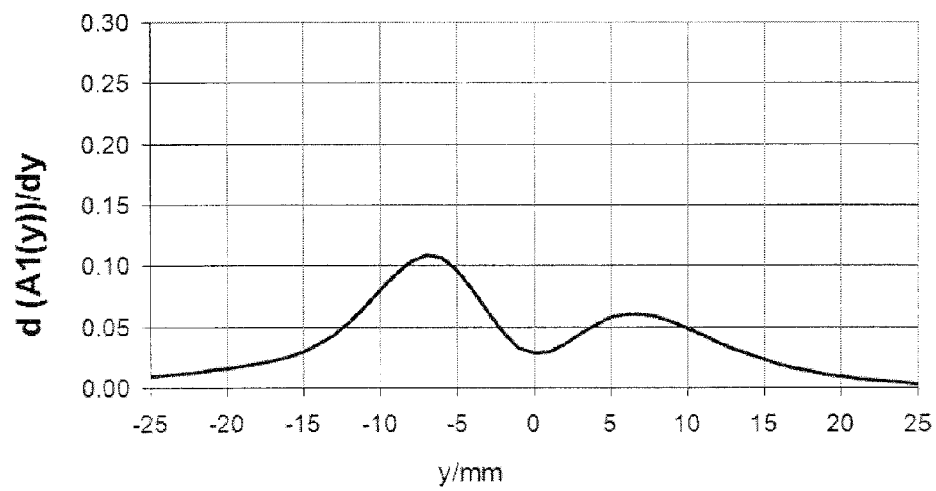

FIG. 15E shows an object distance function $A_1(y)$ (i.e. the modified reciprocal object distance along the main line of sight), which is obtained by overlaying the starting object distance function shown in FIG. 15A with the Gaussian function shown in FIG. 15C. FIG. 15F shows the slope (the first derivative according to y) of the object distance function $A_1(y)$ shown in FIG. 15E. By overlaying the starting object distance function with the Gaussian bell curve shown in FIG. 15C, a modified object distance function is obtained, which is particularly suitable for a for a lens design for computer work. The slope of the modified object distance function $A_1(y)$ has a maximum at $y=-7$ mm, i.e. the modification of the object distance function $A_1(y)$ is greatest there. Accordingly, at a height of $y=-7$ mm there is located the narrowest point in the progression range with respect to the viewing zone width, which is e.g. defined by the 0.5 dpt isoastigmatism line. At a height of $y=0$ mm, the slope of the object distance function $A_1(y)$ has a local minimum. At this height, the viewing zone is relatively wide and can be used for viewing at screens.

Figure 15G:
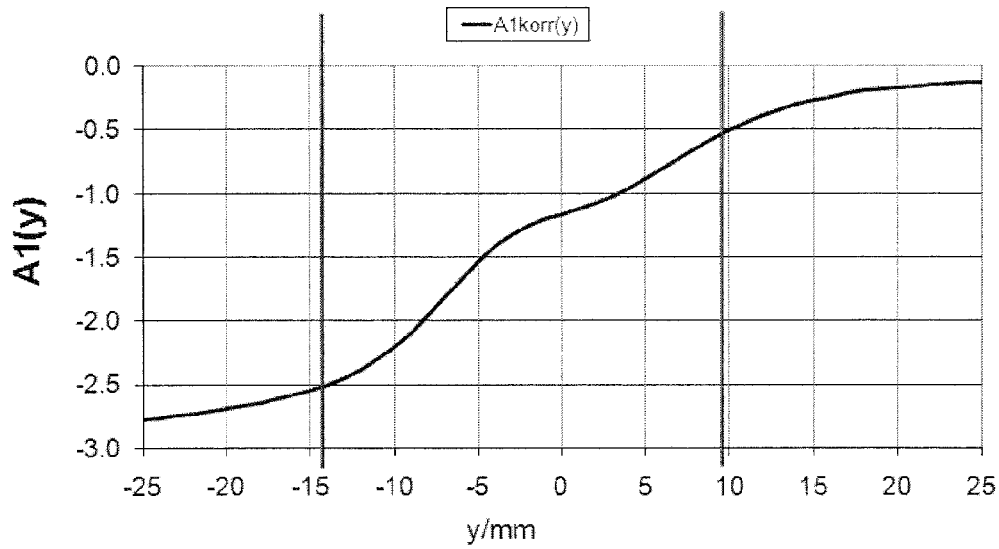

Moreover, the object distance function $A_1(y)$ shown in FIG. 15E can be adjusted to the modified specifications for the object distance in the distance reference point and in the near reference point. FIG. 15G shows a modified object distance function $A_{1new}(y)$ obtained by adjusting the object distance function $A_1(y)$ shown in FIG. 15E to the objectives
$A_1(y=10)=-0.50$ dpt and
$A_1(y=14)=-2.50$ dpt.

The modified and adjusted object distance function is obtained according to the formula $A_{1new}(y)=c+(1+m)A_1(y)$, where $c=0.836$ and $m=0.335$.

Figure 15H:
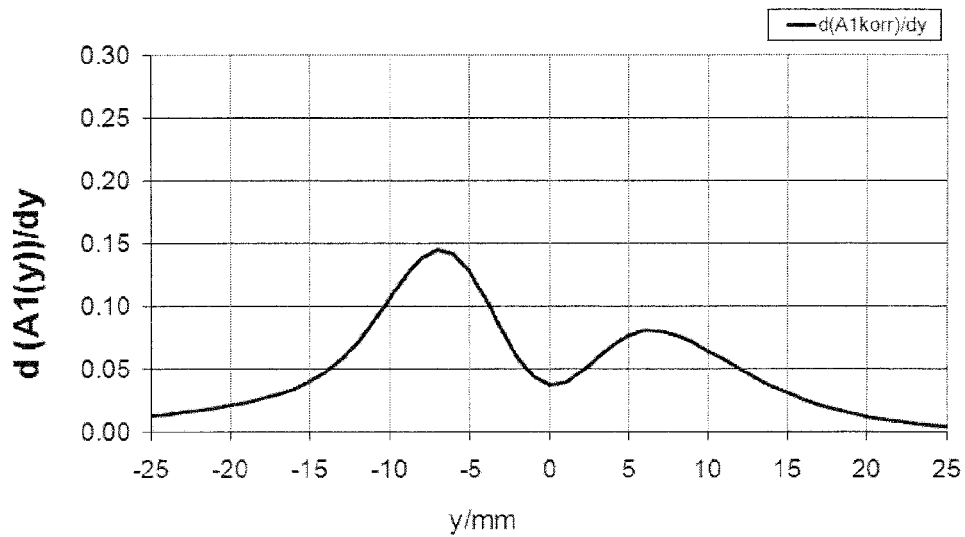

FIG. 15H shows the slope (derivative according to y) of the modified object distance function $A_{1new}(y)$ shown in FIG. 15G.

Figure 16A:
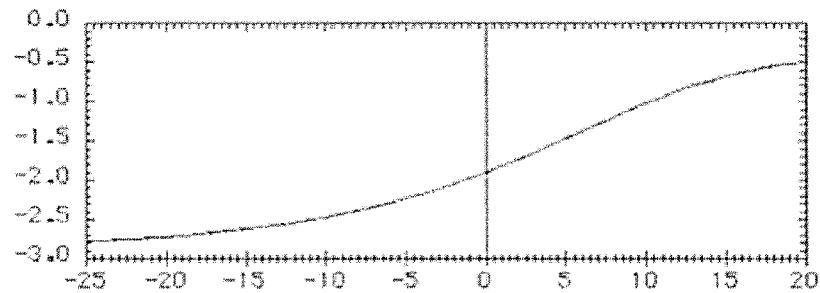

FIG. 16A shows a portion of a graphical user interface, wherein the portion is adapted to visualize the starting object distance function (in the specific case a starting object distance function $A_{1G}(y)$ in the form of a double asymptote function of the form $$A_{1G}(y) = b + \frac{a}{(1+e^{c(y+d)m})}.$$

The graphical user interface can further comprise a portion (not shown in FIG. 16A) having a fields for inputting and optionally modifying the coefficients of the starting object distance function.

Figure 16B:
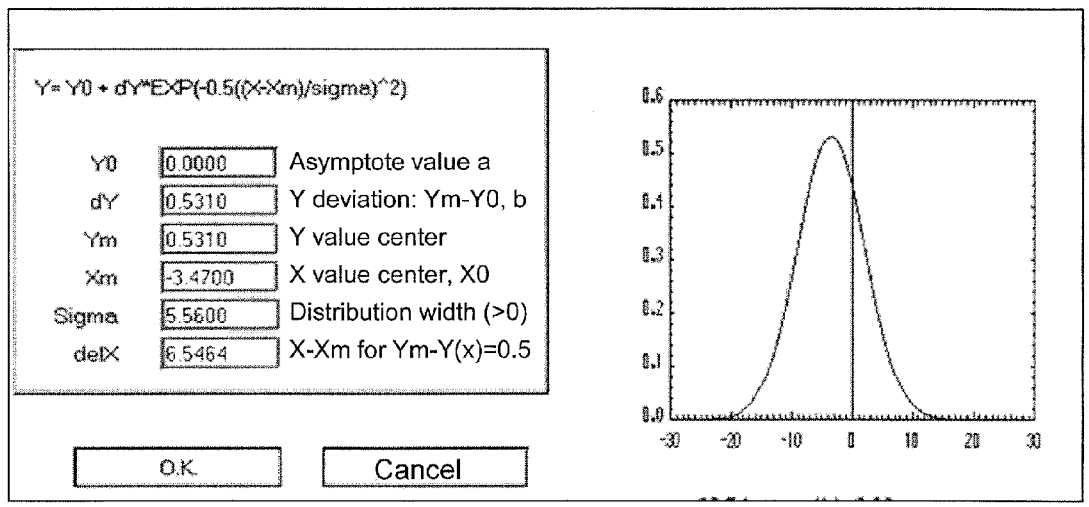

FIG. 16B shows a graphical user interface adapted to visualize a correction function (in this case a Gaussian bell curve of the form $$A_{1Gauss} = a_0 + b_0 e^{-\left(\frac{y-y_0}{\sigma}\right)^2}).$$

Figure 16C:
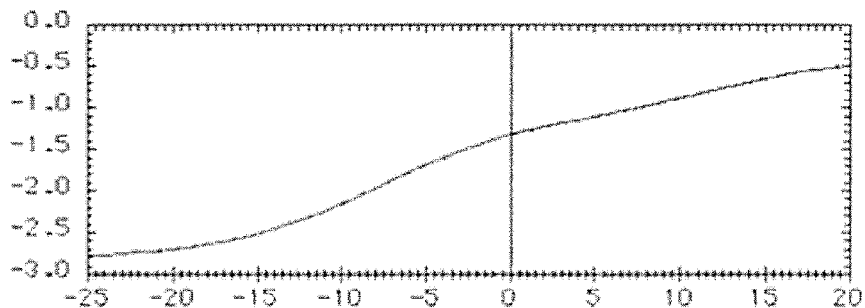

Moreover, the graphical user interface comprises a further portion having input fields/masks in which the coefficients of the correction function are indicated and optionally changed. By the overlay with a correction function in the form of a Gaussian bell curve, the intermediate zone can be weighted new. FIG. 16C shows a graphical user interface with a portion adapted to visualize the object distance function put together by overlaying the starting object distance function with the correction function.

Figure 17A:
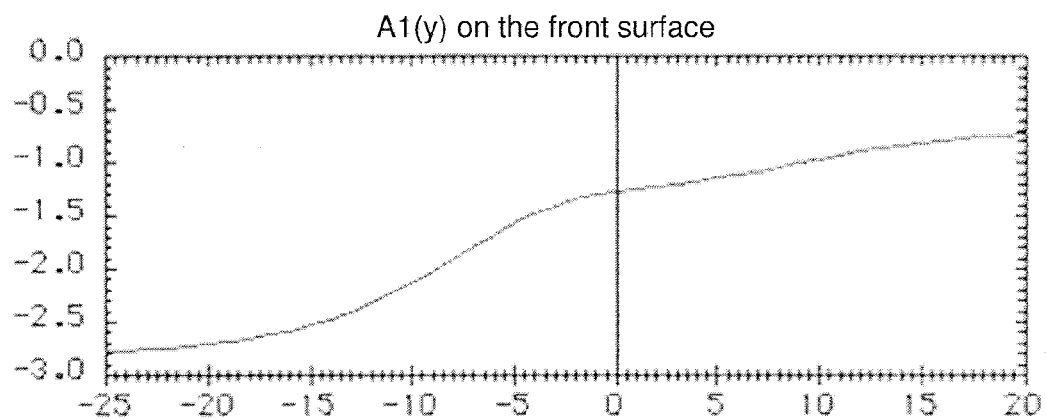
Figure 17B:
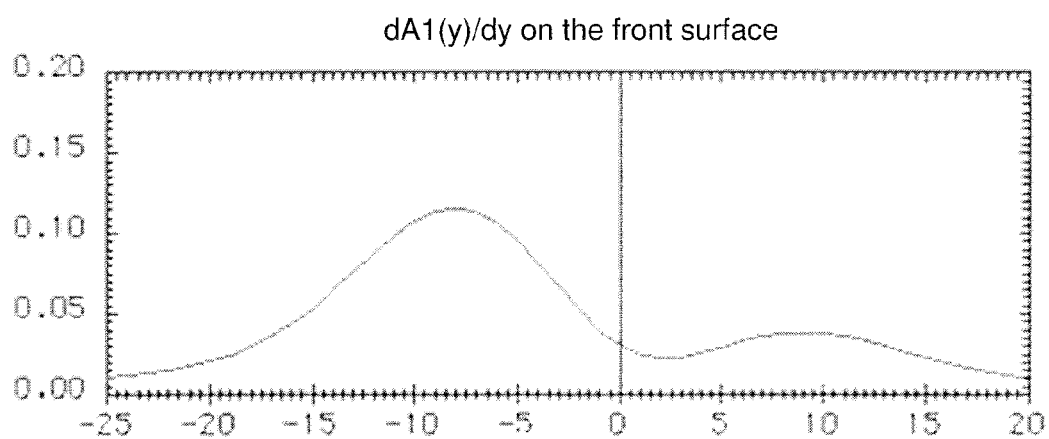

FIGS. 17A and 17B show the course and the derivative of an exemplary starting object distance function (basic function):

FIG. 17A shows the course of the function $A_{1G}(y)$ along the main line in dpt;

FIG. 17B shows the first derivative $$\frac{dA_{1G}(y)}{dy}$$

along the main line.

In this example, the wearer specifications for the desired object distances are $A_{1\,distance}=-0.5$ dpt at the height $y_F=12$ mm and $A_{1near}=-2.75$ dpt at the height $y_N=-14$ mm. The actual values of the starting object distance function $A_{1G}(y)$ in the reference point result for $A_{1G}(y_F)=-0.8896$ dpt and $A_{1G}(y_N)=-2.4721$ dpt.

The starting object distance function shown in FIG. 17A is transformed linearly, wherein the straight line coefficients are calculated depending on the modified specifications for the object distances in the distance and near reference points as c=0.7648 and m=0.4212.

Figure 17C:
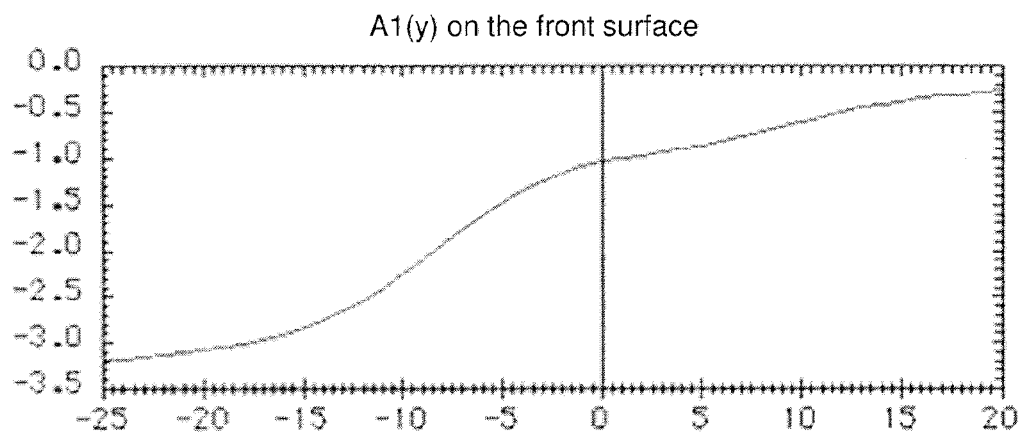
Figure 17D:
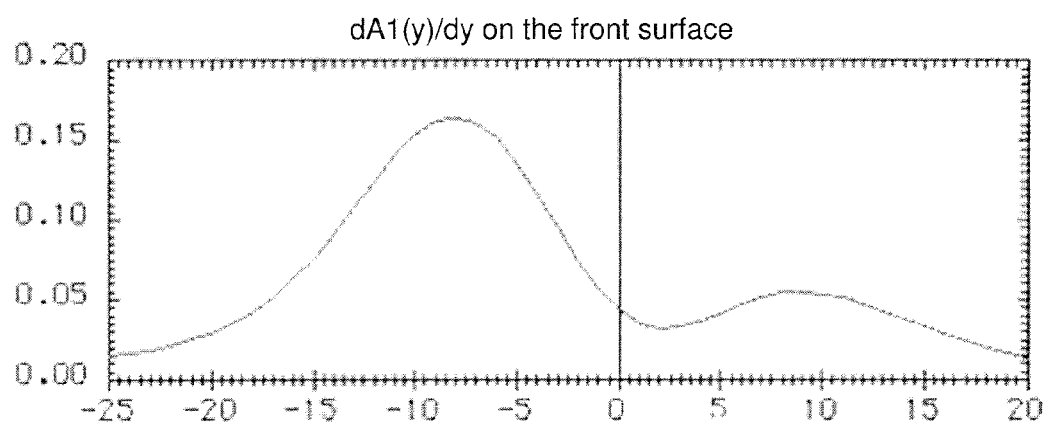

FIGS. 17C and 17D show the course and the derivative of the new transformed object distance function $A_1$ ($A_1$-function), where:

FIG. 17C shows the course of the new object distance function $A_1(y)$ along the main line on the front surface of the spectacle lens; and FIG. 17D shows the derivative $$\frac{dA_1(y)}{dy}$$

of the new object distance function $A_1(y)$ along the main line on the front surface of the spectacle lens.

Figure 18:
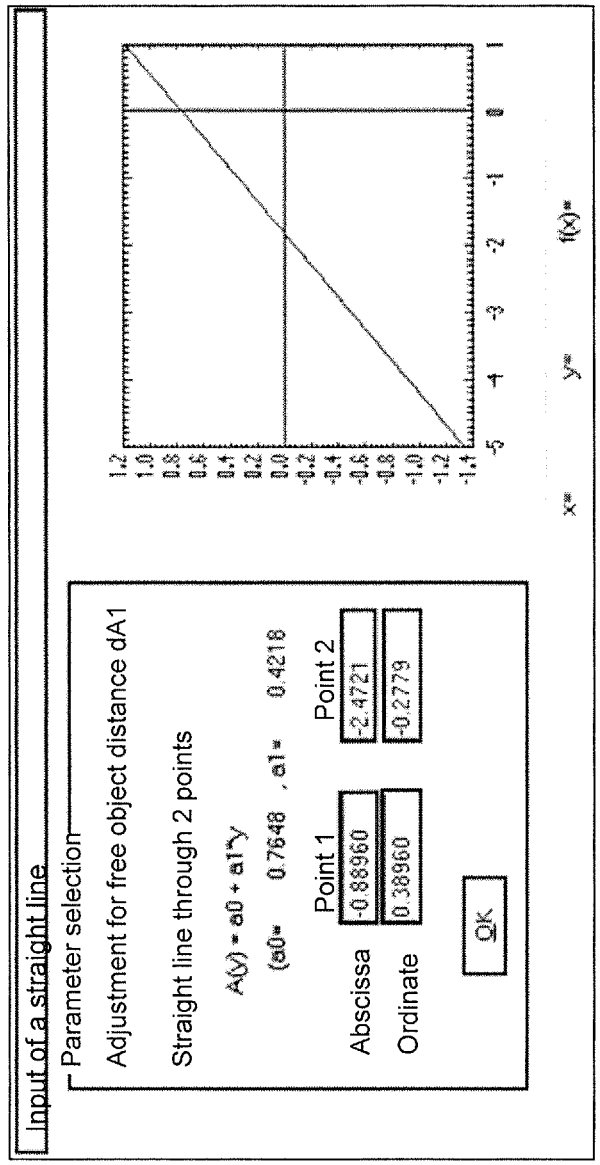
FIG. 18 an exemplary graphical user interface for visualizing and modifying the object distance function.
Figure 19:
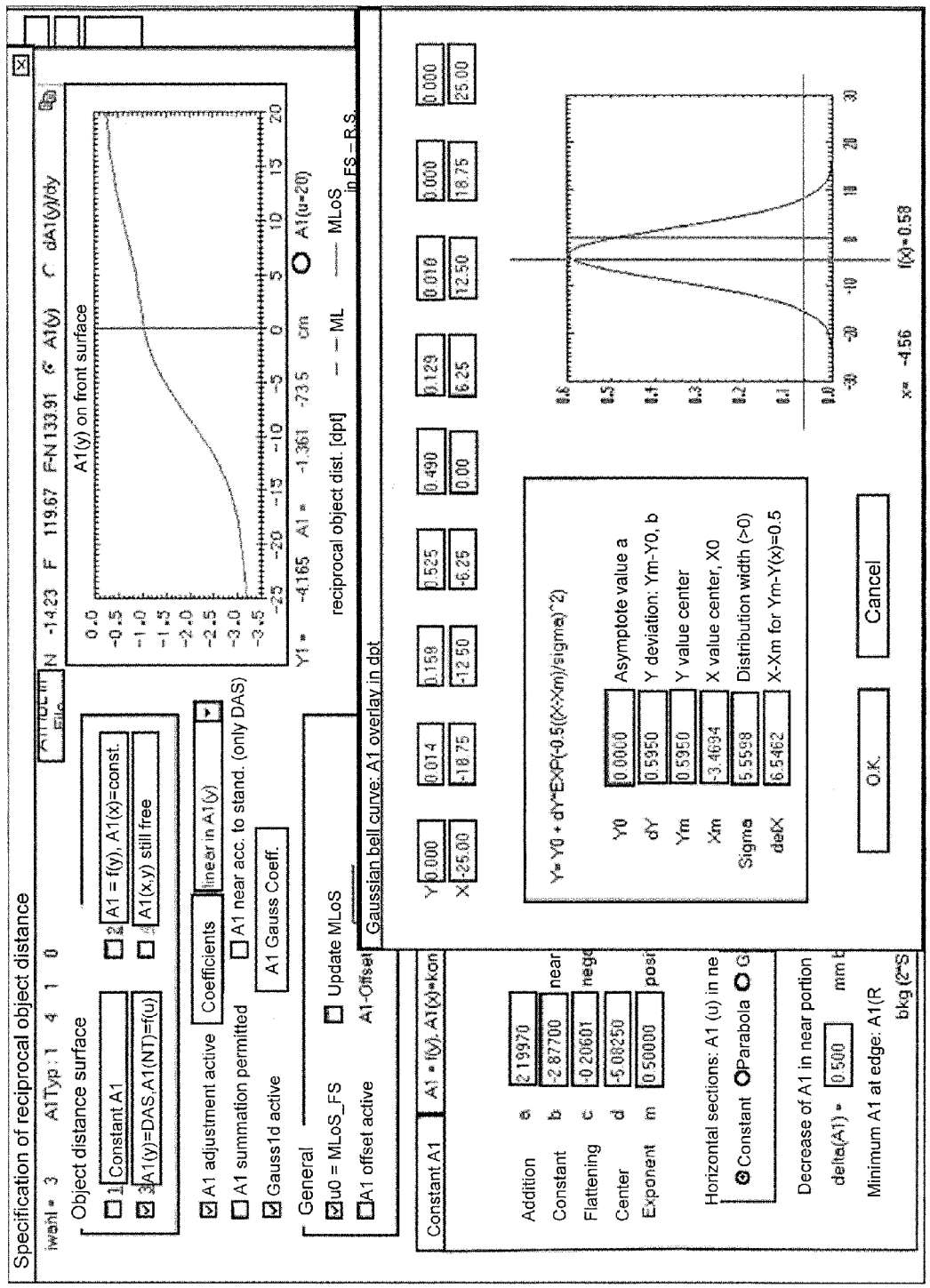
FIG. 19 a further exemplary graphical user interface for visualizing and modifying the object distance function.

FIGS. 18 and 19 show an exemplary mask and an exemplary graphical user interface, respectively for indication and optionally modifying the parameters of the object distance function and for visualizing the thus calculated object distance function.

REFERENCE NUMERAL LIST 10 spectacle lens
12 eye of the spectacles wearer
14 object surface
e corneal vertex distance (CVD)
b' ocular center of rotation distance
sZ' distance corneal vertex–ocular center of rotation
s'BG image distance
Z' ocular center of rotation
R far point sphere
SK vertex sphere

The invention claimed is:

1. A computer-implemented method for optimizing and forming an optimized progressive spectacle lens, comprising:
specifying a starting target astigmatism distribution $Ast_{target_{start}}$ for the progressive spectacle lens;
determining a transformed target astigmatism distribution $Ast_{target_{new}}$; and
optimizing the progressive spectacle lens on the basis of the transformed target astigmatism distribution,
wherein determining a transformed target astigmatism distribution $Ast_{target_{new}}$ comprises:
multiplying the value of the maximum temporal target astigmatism max_$Ast_{target\_temporal_{start}}$ of the starting target astigmatism distribution $Ast_{target_{start}}$ by a factor k:
max_$Ast_{target\_temporal_{new}}$=k* max_$Ast_{target\_temporal_{start}}$,
whereby a modified maximum temporal astigmatism max_$Ast_{target\_temporal_{new}}$ results, wherein the factor k is a function of at least one prescription value and/or of at least one parameter of the spectacle lens or its arrangement in front of the eyes of the spectacles wearer, and
transforming the starting target astigmatism distribution $Ast_{target_{start}}$ to the transformed target astigmatism distribution $Ast_{target_{new}}$ on the basis of the modified maximum temporal astigmatism max_$Ast_{target\_temporal_{new}}$,
wherein it holds for the factor k that:
k=(1-$g_{prescription}$-h),
where
$g_{prescription}$ is a function of at least one prescription value, and
h is a function of at least one parameter of the spectacle lens or its arrangement in front of the eyes of the spectacles wearer.

2. A computer-implemented method for optimizing and forming an optimizing progressive spectacle lens, comprising:
specifying a starting target astigmatism distribution $Ast_{target_{start}}$ for the progressive spectacle lens:
determining a transformed target astigmatism distribution $Ast_{target_{new}}$; and
optimizing the progressive spectacle lens on the basis of the transformed target astigmatism distribution,
wherein determining a transformed target astigmatism distribution $Ast_{target_{new}}$ comprises:
multiplying the value of the maximum temporal target astigmatism max_$Ast_{target\_temporal_{start}}$ of the starting target astigmatism distribution $Ast_{target_{start}}$ by a factor k:
max_$Ast_{target\_temporal_{new}}$=k* max_$Ast_{target\_temporal_{start}}$,
whereby a modified maximum temporal astigmatism max_$Ast_{target\_temporal_{new}}$ results, wherein the factor k is a function of at least one prescription value and/or of at least one parameter of the spectacle lens or its arrangement in front of the eyes of the spectacles wearer, and
transforming the starting target astigmatism distribution $Ast_{target_{start}}$ to the transformed target astigmatism distribution $Ast_{target_{new}}$ on the basis of the modified maximum temporal astigmatism max_$Ast_{target\_temporal_{new}}$, wherein it holds for the factor k that:

k=v*(1−$g_{prescription}$−h), wherein it holds for the factor k that:

$g_{prescription}$ is a function of at least one prescription value;

h is a function of at least one parameter of the spectacle lens or its arrangement in front of the eyes of the spectacles wearer; and V is a prefactor, which is a function of the prescription and/or of the base curve of the spectacle lens and/or of the curvature of the back surface of the spectacle lens.

3. The method according to claim 2, wherein the prefactor v is a double asymptote function of the distance prescription and/or of the base curve of the spectacle lens and/or of the curvature of the back surface of the spectacle lens.

4. The method according to claim 1, wherein $g_{prescription}$ is the function of the prescription astigmatism:

$$g_{prescription} \approx f_{(prescription\ astigmatism)} = \frac{prescription\ astigmatismn}{b},$$

where the parameter b is in the range of 2 to 6.

5. The method according to claim 1, wherein $g_{prescription}$ is a function of the cylinder axis position:

$$g_{prescription} \approx f_{(cylinder\ axis\ position)} = a^* \sin^3(2^* \text{cylinder axis position}),$$

where the parameter a is in the range of 0.05 to 1.0.

6. The method according to claim 1, wherein $g_{prescription}$ is a linear function of the addition:

$$f_{(addition)} = c^* \text{addition} + d,$$

where the parameter c is in the range between 0 and −1, and the parameter d is in the range of 2.0 to 0.

7. The method according to claim 1, wherein h is a function of the tilt angle of the spectacle lens:

$$h \approx f_{(tilt\ angle)} = \frac{tilt\ angle}{g},$$

where the parameter g is in the range of 50 to 500.

8. The method according to claim 1, wherein transforming the starting target astigmatism distribution $Ast_{target_{start}}$ on the basis of the modified maximum temporal astigmatism max_$Ast_{target}$_temporal$_{new}$ comprises an interpolation of the target astigmatism values between a predetermined base target isoastigmatism line and the periphery of the spectacle lens taking the modified maximum temporal astigmatism max$_{13}$ $Ast_{target}$_temporal$_{new}$ into account.

9. A computer program product adapted, when loaded and executed on a computer, to perform a method for optimizing a progressive spectacle lens according to claim 1.

10. A storage medium with a computer program stored thereon, the computer program being adapted, when loaded and executed on a computer, to perform a method for optimizing a progressive spectacle lens according to claim 1.

11. A device for optimizing a progressive spectacle lens, comprising optimizing means adapted to perform an optimization of the spectacle lens according to the method of claim 1.

12. A method for producing a progressive spectacle lens, comprising:

optimizing the spectacle lens according to the method of claim 1, providing surface data of the calculated and optimized spectacle lens; and manufacturing the spectacle lens according to the provided surface data of the spectacle lens.

13. A device for producing a progressive spectacle lens, comprising:

optimizing means adapted to perform an optimization of the spectacle lens according to the method of claim 1; and processing means for finishing the spectacle lens.

14. The method according to claim 4, wherein $g_{prescription}$ is the function of the prescription astigmatism:

$$g_{prescription} \approx f_{(prescription\ astigmatism)} = \frac{prescription\ astigmatismn}{b},$$

where the parameter b is in the range of 4 to 6.

15. The method according to claim 5, wherein $g_{prescription}$ is a function of the cylinder axis position:

$$g_{prescription} \approx f_{(cylinder\ axis\ position)} = a^* \sin^3(2^* \text{cylinder axis position}),$$

where the parameter a is in the range of 0.3 to 0.6.

16. The method according to claim 6, wherein $g_{prescription}$ is a linear function of the addition:

$$f_{(addition)} = c^* \text{addition} + d,$$

where the parameter c is in the range between −0.75 and −0.3, and the parameter d is in the range between 2 and 1.

17. The method according to claim 7, wherein h is a function of the tilt angle of the spectacle lens:

$$h \approx f_{(tilt\ angle)} = \frac{tilt\ angle}{g},$$

where the parameter g is in the range of 100 to 300.

18. The method according to claim 1, further comprising:

forming the optimized progressive spectacle lens based on the transformed target astigmatism distribution $Ast_{target_{new}}$.

* * * * *